US 12,515,170 B2
United States Patent
Liu et al.

(10) Patent No.: US 12,515,170 B2
(45) Date of Patent: Jan. 6, 2026

(54) CO$_2$ CAPTURE AND UTILIZATION SYSTEM AND METHOD

(71) Applicant: University of Kentucky Research Foundation, Lexington, KY (US)

(72) Inventors: Kunlei Liu, Lexington, KY (US); Mark Crocker, Georgetown, KY (US); Heather Nikolic, Stamping Ground, KY (US)

(73) Assignee: University of Kentucky Research Foundation, Lexington, KY (US)

( * ) Notice: Subject to any disclaimer, the term of this patent is extended or adjusted under 35 U.S.C. 154(b) by 573 days.

(21) Appl. No.: 17/868,585

(22) Filed: Jul. 19, 2022

(65) Prior Publication Data
US 2023/0021734 A1    Jan. 26, 2023

Related U.S. Application Data

(60) Provisional application No. 63/223,396, filed on Jul. 19, 2021.

(51) Int. Cl.
*B01D 53/78*    (2006.01)
*A01G 33/00*    (2006.01)
(Continued)

(52) U.S. Cl.
CPC .............. *B01D 53/78* (2013.01); *A01G 33/00* (2013.01); *B01D 53/1406* (2013.01);
(Continued)

(58) Field of Classification Search
CPC ............... B01D 53/78; B01D 53/1406; B01D 53/1425; B01D 53/1475; B01D 71/36;
(Continued)

(56) References Cited

U.S. PATENT DOCUMENTS

2010/0218507 A1* 9/2010 Cherson .................... F03D 9/00
                                                                    423/409
2011/0266220 A1* 11/2011 Campos ................. B01D 71/76
                                                                    585/818
(Continued)

FOREIGN PATENT DOCUMENTS

CN          103721530 A  *  4/2014

OTHER PUBLICATIONS

Diao, N., Q. Li, and Z. Fang. 2004. Heat transfer in ground heat exchangers with groundwater advection. International Journal of Thermal Sciences. 43: 1203-1211, https://doi.org/10.1016/j.ijthermalsci.2004.04.009.

(Continued)

*Primary Examiner* — Jennifer Dieterle
*Assistant Examiner* — Qianping He
(74) *Attorney, Agent, or Firm* — Stites & Harbison PLLC; Gary N. Stewart

(57) ABSTRACT

A carbon dioxide (CO$_2$) capture and utilization system captures CO$_2$ from flue gas and utilizes the same to enhance algae or cyanobacteria growth. The system generally comprises a CO$_2$ capture unit and a utilization unit that is in fluid communication with the CO$_2$ capture unit. The CO$_2$ capture unit includes a membrane CO$_2$ absorber that captures CO$_2$ from incoming flue gas to produce a CO$_2$-rich solvent. The utilization unit processes the CO$_2$-rich solvent to produce a product stream that includes CO$_2$ and NH$_3$ in a predetermined CO$_2$:NH$_3$ ratio. The product stream is delivered to a cultivation subsystem of the utilization of the unit including one or more species of algae or cyanobacteria. A method for capturing and utilizing CO$_2$ is also provided herein.

15 Claims, 19 Drawing Sheets

(51) Int. Cl.
  *B01D 53/14* (2006.01)
  *B01D 71/36* (2006.01)
(52) U.S. Cl.
  CPC ..... *B01D 53/1425* (2013.01); *B01D 53/1475* (2013.01); *B01D 71/36* (2013.01); *B01D 2251/2065* (2013.01); *B01D 2257/504* (2013.01); *B01D 2258/0283* (2013.01)
(58) Field of Classification Search
  CPC ...... B01D 2251/2065; B01D 2257/504; B01D 2258/0283; A01G 33/00; Y02C 20/40; Y02P 20/151; Y02P 20/54
  USPC .......................................................... 95/199
  See application file for complete search history.

(56) References Cited

U.S. PATENT DOCUMENTS

| | | | | |
|---|---|---|---|---|
| 2015/0119577 | A1* | 4/2015 | Campos | C07C 209/86 548/335.1 |
| 2017/0341942 | A1* | 11/2017 | Harper, Jr. | F01K 7/16 |
| 2018/0245108 | A1* | 8/2018 | Reed | C12P 7/065 |
| 2019/0233296 | A1* | 8/2019 | Novek | B01D 61/029 |
| 2019/0240616 | A1* | 8/2019 | Eliseev | B01D 71/262 |

OTHER PUBLICATIONS

He, Q., M. Chen, L. Meng, K. Liu, and W. Pan. 2004. Study on Carbon Dioxide Removal from Flue Gas by Absorption of Aqueous Ammonia. Western Kentucky University. https://www.semanticscholar.org/paper/Study-on-Carbon-Dioxide-Removal-from-Flue-Gas-by-of-He-Chen/4994d1230f70482e0b2fa8abbecd9a1daedfd5e0.

Yeh, A.C., and H. Bai. 1999. Comparison of ammonia and monoethanolamine solvents to reduce CO2 greenhouse gas emissions. The Science of the Total Environment. 228: 121-133, https://doi.org/10.1016/S0048-9697(99)00025-X.

Villeneuve, K., D. Roizard, J.C. Remigy, M. Iacono, and S. Rode. 2018. CO2 capture by aqueous ammonia with hollow fiber membrane contactors: Gas phase reactions and performance stability. Separation and Purification Technology, 199: 189-197, https://doi.org/10.1016/j.seppur.2018.01.052.

Toro Molina, C., and C. Bouallou. 2016. Carbon dioxide absorption by ammonia intensified with membrane contactors. Clean Techn Environ Policy 18, 2133-2146 (2016), https://doi.org/10.1007/s10098-016-1140-0.

Makhloufi, C., E. Lasseuguette, J.C. Remigy, B. Belaissaoui, D. Roizard, and E. Favre. 2014. Ammonia based CO2 capture process using hollow fiber membrane contactors. Journal of Membrane, Science, 455. 236-246, https://doi.org/10.1016/j.memsci.2013.12.063.

Berman, T., and S. Chava. 1999. Algal growth on organic compounds as nitrogen sources. Israel Oceanographic. 21: 1423-1437, https://doi.org/10.1093/plankt/21.8.1423.

Finlay, K., P. R. Leavitt, B. Wissel, and Y. T. Prairie. 2009. Regulation of spatial and temporal variability of carbon flux in six hard-water lakes of the northern Great Plains. Limnol. Oceanogr. 54: 2553-2564, https://doi.org/10.4319/lo.2009.54.6_part_2.2553.

Sutter, D., M. Gazzani, and M. Mazzotti. 2015. Formation of solids in ammonia-based CO2 capture processes—Identification of criticalities through thermodynamic analysis of the CO2—NH3—H20 system. Chemical Engineering Science. vol. 133, Sep. 8, 2015, pp. 170-180, https://doi.org/10.1016/j.ces.2014.12.064.

Wilson, M.H., J.G. Groppo, T. Grubbs, S. Kesner, E.M. Frazar, A. Shea, C. Crofcheck, and M. Crocker. 2016. Capture and Recycle of Industrial CO2 Emissions using Microalgae. Appl. Petrochem. Res., 6: 279-293, https://doi.org/10.1007/s13203-016-0162-1.

McBride, R.C., et al. 2016. Crop protection in open ponds, in Microalgal Production for Biomass and High-Value Products, S.P. Slocombe and J.R. Benemann, Editors. CRC Press: Boca Raton, FL.

Beckstrom, B.D., M.H. Wilson, M. Crocker, and J.C. Quinn. 2020. Bioplastic production from microalgae with fuel co-products: A techno-economic and life-cycle assessment, Algal Res., in press. 46: 101769, https://doi.org/10.1016/j.algal.2019.101769.

Somers, M.D; and Quinn, J.C; Sustainability of carbon delivery to an algal biorefinery: A techno-economic and life-cycle assessment, Journal of $CO_2$ Utilization 30 (2019) 193-204.

Cost and Performance Baseline for Fossil Energy Plants vol. 1: Bituminous Coal and Natural Gas to Electricity Revision 4, (NETL-PUB-22638), United States Department of Energy (DOE), National Energy Technology Laboratory (NETL), Pittsburgh, Pennsylvania, Sep. 2019. https://netl.doe.gov/projects/files/CostAndPerformanceBaselineForFossilEnergyPlantsVol1BitumCoalAndNGtoElectBBRRev4-1_092419.pdf.

Crocker, M., J. Groppo, S. Kesner, D. Mohler, R. Pace, E. Santillan-Jimenez, M. Wilson, J. Schambach, J. Stewart, and A. Zeller. 2018. A Microalgae-Based Platform for the Beneficial Re-use of Carbon Dioxide Emissions from Power Plants, Final Technical Report, DOE-KENTUCKY-FE0026396, https://www.osti.gov/biblio/1419316/.

Mordor Intelligence. 2019. Bioplastics Market-Growth, Trends and Forecast (2020-2025). https://www.mordorintelligence.com/industry-reports/bioplastics-market.

European Bioplastics. 2019. Bioplastics market data. https://www.european-bioplastics.org/market/.

Laurens, L.M.L, M. Chen-Glasser, and J.D. McMillan. 2017. A perspective on renewable bioenergy from photosynthetic algae as feedstock for biofuels and bioproducts. Algal Res. 24A: 261-264, https://doi.org/10.1016/j.algal.2017.04.002.

Williams, P.J.B., and L.M.L. Laurens. 2010. Microalgae as biodiesel & biomass feedstocks: Review & analysis of the biochemistry, energetics & economics. Energy Environ. Sci., 3: 554-590, https://doi.org/10.1039/b924978h.

Crofcheck, C., X. E, A. Shea, M. Montross, M. Crocker, and R. Andrews. 2013. Influence of flue gas components on the growth rate of Chlorella vulgaris and Scenedesmus acutus. Trans. ASABE, 56(6): 1421, https://doi.org/10.13031/trans.56.10094.

Crofcheck, C., X. E, A. Shea, M. Montross, R. Andrews, and M. Crocker. 2012. Influence of media composition on the growth rate of Chlorella vulgaris and Scenedesmus acutus utilized for CO2 mitigation. J. Biochem. Technol., 42: 589-594, https://doi.org/10.13031/2013.41734.

Rhea, N.A., J. Groppo, and C. Crofcheck. 2017. Evaluation of Flocculation, Sedimentation and Filtration for Dewatering of Scenedesmus Algae. Trans ASABE, 60(4): 1359-1367, https://pdfs.semanticscholar.org/de93/69bd4a422ff9889231d82baeb8226dd8e920.pdf.

Wilson, M.H., A. Placido, S. Graham, S.A. Morton III, E. Jimenez-Santillan, A. Shea, M. Crocker, C. Crofcheck, and R. Andrews. 2014. CO2 Recycling using Microalgae for the Production of Fuels. Appl. Petrochem. Res., 4: 41-53, https://doi.org/10.1007/s13203-014-0052-3.

Mohler, D.T., M.H. Wilson, Z. Fan, J.G. Groppo, and M.Crocker. 2019. Beneficial Reuse of Industrial CO2 Emissions Using a Microalgae Photobioreactor: Waste Heat Utilization Assessment. Energies. 12(13), 2634, https://doi.org/10.3390/en12132634.

Melanson, D., and J. Wells. 2016. "UK CAER Algal Research Hitting the Ground in China." University of Kentucky. UKNow. https://uknow.uky.edu/research/centers-and-institutes/center-applied-energy-research-caer/uk-caer-algal-research-hitting.

Crofcheck, C.; E, X.; Shea, A.; Montross M.; Crocker, M.; Andrews, R. 2012. Influence of media composition on the growth rate of Chlorella vulgaris and Scenedesmus acutus utilized for CO2 mitigation, J. Biochem. Technol., 4(2): 589-594.

Compact Membrane Systems. 2020. Membrane Materials & Technologies for Tough Chemical Separations. https://compactmembrane.com/.

* cited by examiner

Average culture growth rate as a function of molar $CO_2:NH_3$ ratio.

$CO_2$ CAPTURE AND UTILIZATION SYSTEM AND METHOD

CROSS-REFERENCE TO RELATED APPLICATIONS

The present application claims priority to U.S. Patent Application Ser. No. 63/223,396, filed on Jul. 19, 2021, the entire disclosures of which is incorporated herein by reference.

GOVERNMENT INTEREST

This invention was made with government support under grant number DE-3210000293 awarded by the USA-China Clean Energy Research Center (CERC) and grant number DE-FE0031921 awarded by the U.S. Department of Energy (DOE). The government has certain rights in the invention.

TECHNICAL FIELD

The present disclosure is directed to a $CO_2$ capture and utilization system and method. In particular, the present disclosure is directed to a $CO_2$ capture and fixation system and method which utilize dual-function $NH_3$ looping, an indirect membrane $CO_2$ absorber, and a solvent regenerator delivering just-in-time $CO_2$ and $NH_3$ distribution to reduce $CO_2$ capture cost and provide improved algae or cyanobacteria production.

INTRODUCTION

In recent years, $CO_2$ capture and utilization systems that utilize captured $CO_2$ for algae production have been developed for power plant-related applications in an effort to reduce $CO_2$ emissions. In some known $CO_2$ capture and utilization systems, an algae culture is either directly contacted (e.g., through flue gas compression, transport and bubble through, or Venturi induction to algae culture) or indirectly contacted (e.g., through capture, transport and supply of high purity $CO_2$) by flue gas, with each respective configuration having its advantages and disadvantages with respect to incoming $CO_2$ supply, heavy metal contamination, operability, energy consumption, capital investment, and life cycle of $CO_2$ emission.

Although bubbling $CO_2$ is a tried and tested method for carbon supplementation of algae cultures that has proven effective, the capital (material cost) and operating (pressure drop) expenses have to be considered and balanced. For example, a ceramic sparger produces smaller bubbles, increasing mass transfer efficiency, but generates a higher pressure drop, that proves undesirable after a life cycle analysis (LCA) due to the gas compression energy penalty. As an alternative, $CO_2$ supply from an aqueous caustic stream (pH>7) pre-saturated with $CO_2$ shows potential for lowering operating costs and increasing the viable distance between an algae farm and a point source of emissions. Once the aqueous $HCO_3^-$ and $CO_3^{2-}$ have been consumed by the algae, the liquid is recycled for $CO_2$ capture. However, notable technical challenges have to be overcome. First, the high water blowdown with the algae harvest requires significant amine or sodium/potassium makeup if it is not a consumable nutrient for algae growth, which destroys the economics and LCA of such approach. Second, fouling on the absorber internal $CO_2$ capture packing surface is caused by algae and nutrients in the algae growth media. This fouling is similar to algae fouling commonly seen on cooling tower packing resulting from continued organism growth in the dark. Hence, a $CO_2$ capture solvent that can also act as a nutrient for algae growth would be ideal.

$NH_3$ is attractive for $CO_2$ capture and as an algae nutrient. For $CO_2$ capture it is inexpensive, has a low regeneration energy, zero degradation and a viscosity near that of water. Numerous studies have shown that the scrubbing capacity of $NH_3$ is approximately 0.9-1.2 kg of $CO_2$/kg of $NH_3$, with a $CO_2$ removal efficiency of ~99% and half the solvent regeneration energy than that of 30 wt % MEA. The main drawback is, however, high $NH_3$ emission. Hydrophobic membranes have been studied for $CO_2$ capture using an aqueous $NH_3$ solution.[12] However, despite the fact that significant reduction of the $NH_3$ slip has been achieved, there is still a critical challenge regarding long-term performance stability in industrial applications due to crystallization of ammonium ($NH_4^+$) salts on the lumen side of the membrane due to the reverse permeation of $NH_3$ from liquid side to gas side then reacting with gaseous $CO_2$.

Another known problem in $CO_2$ capture and utilization systems is the inhibition of algae growth due to frequent pH swings in the algae bioreactor due to unbalanced (intermittent) feeding systems for $CO_2$ and N. Moreover, in larger systems (e.g., 1000s of acres), the distance between gas spargers and an algae bioreactor may adversely affect $CO_2$ delivery and feed to algae. Additionally, in known systems, short-term planned or unplanned disruptions in flue gas can disrupt $CO_2$ supply to the algae bioreactor and thus adversely affect algae growth.

Accordingly, there is thus a need for improved $CO_2$ capture and utilization systems and methods.

SUMMARY

The presently disclosed subject matter meets some or all of the above-identified needs, as will become evident to those of ordinary skill in the art after a study of information provided in this document.

This summary describes several embodiments of the presently-disclosed subject matter, and in many cases lists variations and permutations of these embodiments. This summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently-disclosed subject matter, whether listed in this summary or not. To avoid excessive repetition, this summary does not list or suggest all possible combinations of such features.

Provided herein is a carbon dioxide ($CO_2$) capture and utilization system.

The $CO_2$ capture and utilization system includes: a $CO_2$ capture unit configured to capture $CO_2$ from flue gas introduced into the system from an industrial facility, such as coal-fired power plant or natural gas plant, or other source; and a utilization unit which is in fluid communication with the $CO_2$ capture unit, and which processes the $CO_2$ captured from the incoming flue gas to improve algae or cyanobacteria production. The $CO_2$ capture unit includes a membrane $CO_2$ absorber configured to receive flue gas. The membrane $CO_2$ absorber includes a first section in which flue gas is received into the membrane $CO_2$ absorber, a second section through which an ammonium solvent passes, and a membrane that is positioned between the first section and the second section of the membrane $CO_2$ absorber. In some embodiments, the ammonium solvent includes ammonium hydroxide ($NH_4OH$). In some embodiments the ammonium solvent includes a chelating agent to reduce $NH_3$ slip through the membrane of the membrane $CO_2$ absorber. In some embodiments, the chelating agent is one of triethylene glycol di-2-ethylhexoate (TGDE), amino trimethylene phosphonic acid (AMP), tris(hydroxymethyl)aminomethane (Tris), and $ZnCl_2$. The membrane of the membrane $CO_2$ absorber is configured to prevent direct contact between the flue gas and the ammonium solvent but permit the passage of $CO_2$ within the flue gas from the first section to the second section to interact with the ammonium solvent. The interaction between the ammonium solvent and the $CO_2$ from the flue gas produce a $CO_2$-rich solvent.

The utilization unit includes a cultivation subsystem which aids in the cultivation of one or more species of algae or cyanobacteria contained therein. In some embodiments, the cultivation subsystem includes at least one of a photobioreactor and an open raceway pond. In use, the utilization system processes the $CO_2$-rich solvent to produce a product stream that is provided to the cultivation subsystem and includes $CO_2$ and $NH_3$ in a predetermined $CO_2$:$NH_3$ ratio. In some embodiments, the predetermined $CO_2$:$NH_3$ ratio is about 7:1 to about 16:1. In some embodiments, the predetermined $CO_2$:$NH_3$ ratio is about 10:1. In some embodiments, the utilization unit includes a solvent regenerator that is in fluid communication with the membrane $CO_2$ absorber and is configured to process the $CO_2$-rich solvent to produce the product stream that is subsequently delivered to the cultivation subsystem. In some embodiments, the solvent regenerator is proximally located to the cultivation subsystem, such that the solvent generator provides just-in-time distribution of the predetermined $CO_2$:$NH_3$ ratio to the cultivation subsystem. In some embodiments, the solvent regenerator and/or cultivation subsystem may be solar powered, and, to this end, operably connected to one or more solar cells.

In some embodiments, the $CO_2$ capture and utilization system further includes conduit in fluid communication with a flue gas supply and the membrane $CO_2$ absorber. In such embodiments, the conduit and the membrane $CO_2$ absorber are preferably oriented relative to each other, such that, when flue gas from the flue gas supply is saturated, the conduit delivers the saturated flue gas in a downflow that washes the membrane of the membrane $CO_2$ absorber. In some embodiments, the membrane $CO_2$ absorber is a hollow fiber membrane. In one such embodiment, the membrane $CO_2$ absorber includes a non-porous polymer comprising a fluoride material and a microporous hollow fiber support comprising polyether ether ketone (PEEK). In some embodiments, the membrane $CO_2$ absorber is a flat sheet membrane. In one such embodiment, the membrane of the membrane $CO_2$ absorber includes a polyethersulfone (PES) and polytetrafluoroethylene (PTFE).

In some embodiments, a lean solvent corresponding to the portion of the $CO_2$-rich solvent remaining after $NH_3$ is removed from the $CO_2$-rich solvent to produce the product stream is transferred from the utilization unit to the membrane $CO_2$ absorber.

A method for capturing and utilizing carbon dioxide ($CO_2$) is also provided herein. The method includes: receiving flue gas into a membrane $CO_2$ absorber containing an ammonium solvent; processing, by a solvent regenerator, a $CO_2$-rich solvent received from the membrane $CO_2$ absorber to produce a product stream including $CO_2$ and $NH_3$ in a predetermined $CO_2$:$NH_3$ ratio, where the $CO_2$-rich solvent results from an interaction between the ammonium solvent and $CO_2$ from the flue gas within the membrane $CO_2$ absorber; and providing the product stream to one or more species of algae or cyanobacteria. In some implementations, the flue gas is saturated and received into the a membrane $CO_2$ absorber in a downflow which washes a membrane of the membrane $CO_2$ absorber. In some implementations, the ammonium solvent includes ammonium hydroxide ($NH_4OH$). In some implementations, the $CO_2$ and $NH_3$ are provided to the one or more species of algae or cyanobacteria in a $CO_2$:$NH_3$ ratio of about 7:1 to 16:1.

BRIEF DESCRIPTION OF THE DRAWINGS

The presently disclosed subject matter will be better understood, and features, aspects and advantages other than those set forth above will become apparent when consideration is given to the following detailed description thereof. Such detailed description makes reference to the following drawings, wherein.

DESCRIPTION OF EXEMPLARY EMBODIMENTS

Figure 1:
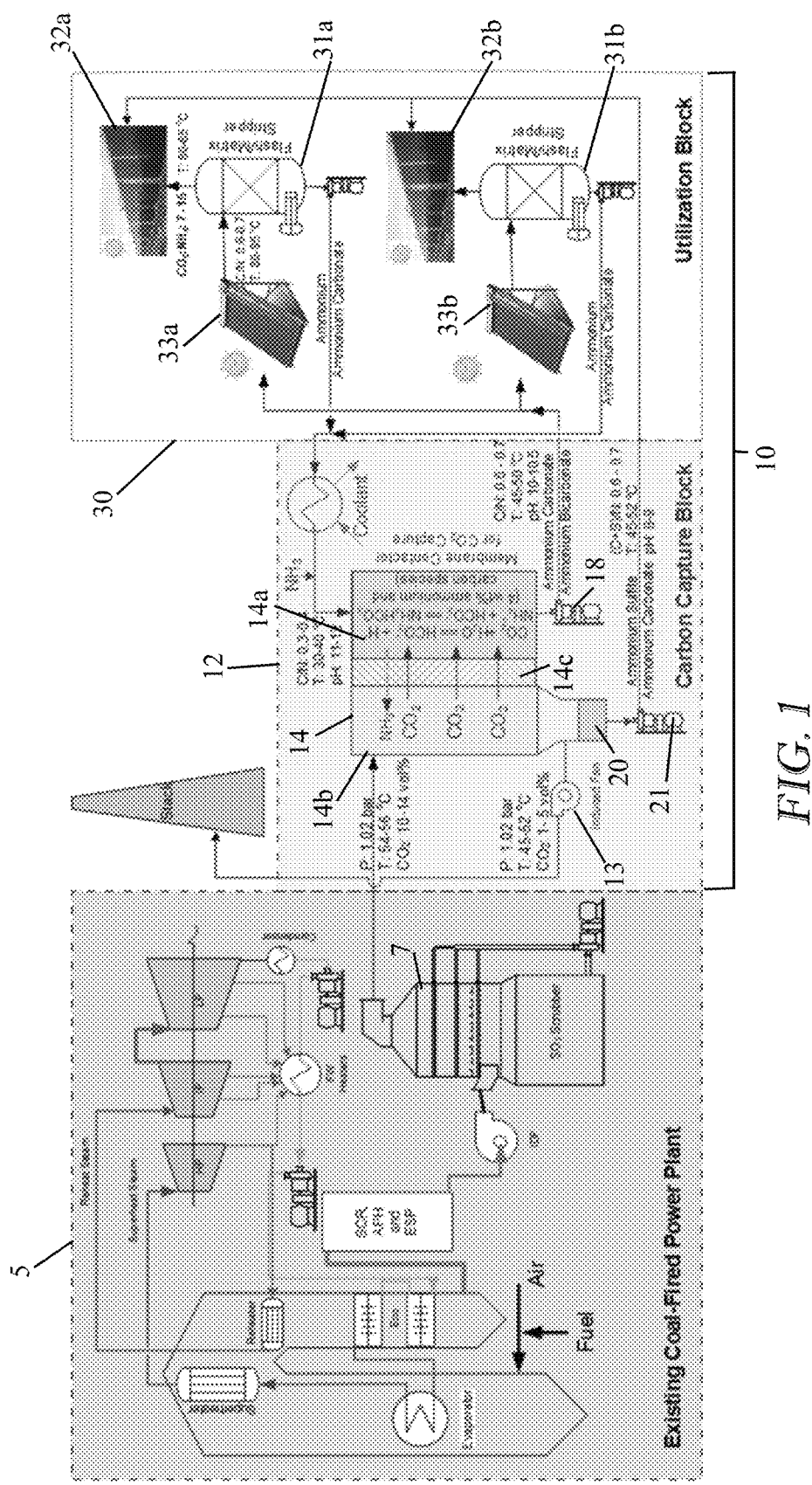
FIG. 1 is a schematic diagram of an exemplary $CO_2$ capture and fixation system made in accordance with the present invention and an industrial facility from which the exemplary $CO_2$ capture and fixation system receives flue gas.

Unless defined otherwise, all technical and scientific terms used herein have the same meaning as commonly understood by one of ordinary skill in the art to which the disclosure belongs. Any methods and materials similar to or equivalent to those described herein can be used in the practice or testing of the present disclosure, including the methods and materials that are described below.

As used herein, and unless otherwise indicated, the term "flue gas" is understood to mean an exhaust gas which includes carbon dioxide ($CO_2$) and which is emitted from an industrial facility, regardless of the conduit by which such exhaust gas is emitted from the industrial facility or the type of industrial facility. Accordingly, unless indicated to the contrary, "flue gas" encompasses variations including: in some embodiments, the flue gas is emitted from a power plant, such as a coal-fired power plant or natural gas-fired power plant; in some embodiments, the flue gas is emitted from a chemical plant; in some embodiments, the flue gas is emitted from a utilities plant; and in some embodiments, the flue gas is emitted from a cement plant.

Reference to a first component being in fluid communication with a second component is understood to mean that the first component and the second component are directly or indirectly connected by suitable means as to permit liquid to be transferred from the first component and received by the second component. In this regard, one of skill in the art will appreciate that a first component is still considered to be in fluid communication with a second component in instances where there are one or more intervening components (e.g., a heat exchanger, pump, etc.) which treat or process the fluid or gas directed from the first component prior to being received at the second component.

Following long-standing patent law convention, the terms "a," "an," and "the" refer to "one or more" when used in this application, including the claims. Thus, for example, reference to "a cell" includes a plurality of cells, and so forth.

The terms "comprising," "including," and "having" are intended to be inclusive and mean that there may be additional elements other than the listed elements.

Unless otherwise indicated, all numbers expressing quantities of ingredients, properties such as reaction conditions, and so forth used in the specification and claims are to be understood as being modified in all instances by the term "about." Accordingly, unless indicated to the contrary, the numerical parameters set forth in this specification and claims are approximations that can vary depending upon the desired properties sought to be obtained by the presently-disclosed subject matter.

As used herein, the term "about," when referring to a value or to an amount of mass, weight, time, volume, concentration, percentage, or the like is meant to encompass variations of in some embodiments ±50%, in some embodiments ±40%, in some embodiments ±30%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

All combinations of method or process steps as used herein can be performed in any order, unless otherwise specified or clearly implied to the contrary by the context in which the referenced combination is made.

Where reference is made to a URL or other such identifier or address, it is understood that such identifiers can change and particular information on the Internet can come and go, but equivalent information can be found by searching the Internet. Reference thereto evidences the availability and public dissemination of such information.

As used herein, nomenclature for compounds, including organic compounds, can be given using common names, IUPAC, IUBMB, or CAS recommendations for nomenclature. When one or more stereochemical features are present, Cahn-Ingold-Prelog rules for stereochemistry can be employed to designate stereochemical priority, E/Z specification, and the like. One of skill in the art can readily ascertain the structure of a compound if given a name, either by systemic reduction of the compound structure using naming conventions, or by commercially available software, such as CHEMDRAW™ (Cambridgesoft Corporation, U.S.A.).

As used herein, the terms "optional" or "optionally" means that the subsequently described event or circumstance can or cannot occur, and that the description includes instances where said event or circumstance occurs and instances where it does not.

The details of one or more embodiments of the presently-disclosed subject matter are set forth in this document. Modifications to embodiments described in this document, and other embodiments, will be evident to those of ordinary skill in the art after a study of the information provided in this document. The information provided in this document, and particularly the specific details of the described exemplary embodiments, is provided primarily for clearness of understanding and no unnecessary limitations are to be understood therefrom. In case of conflict, the specification of this document, including definitions, will control.

Provided herein is a carbon dioxide ($CO_2$) capture and utilization system which provides reduced $CO_2$ capture cost and improved algae production. Accordingly, the system 10 of the present disclosure may find utility in a variety of environments and applications in which a reduction in the capital cost of $CO_2$ capture from flue gas or otherwise and/or enhanced algae growth within a bioreactor or raceway system is needed or desired.

Figure 8:
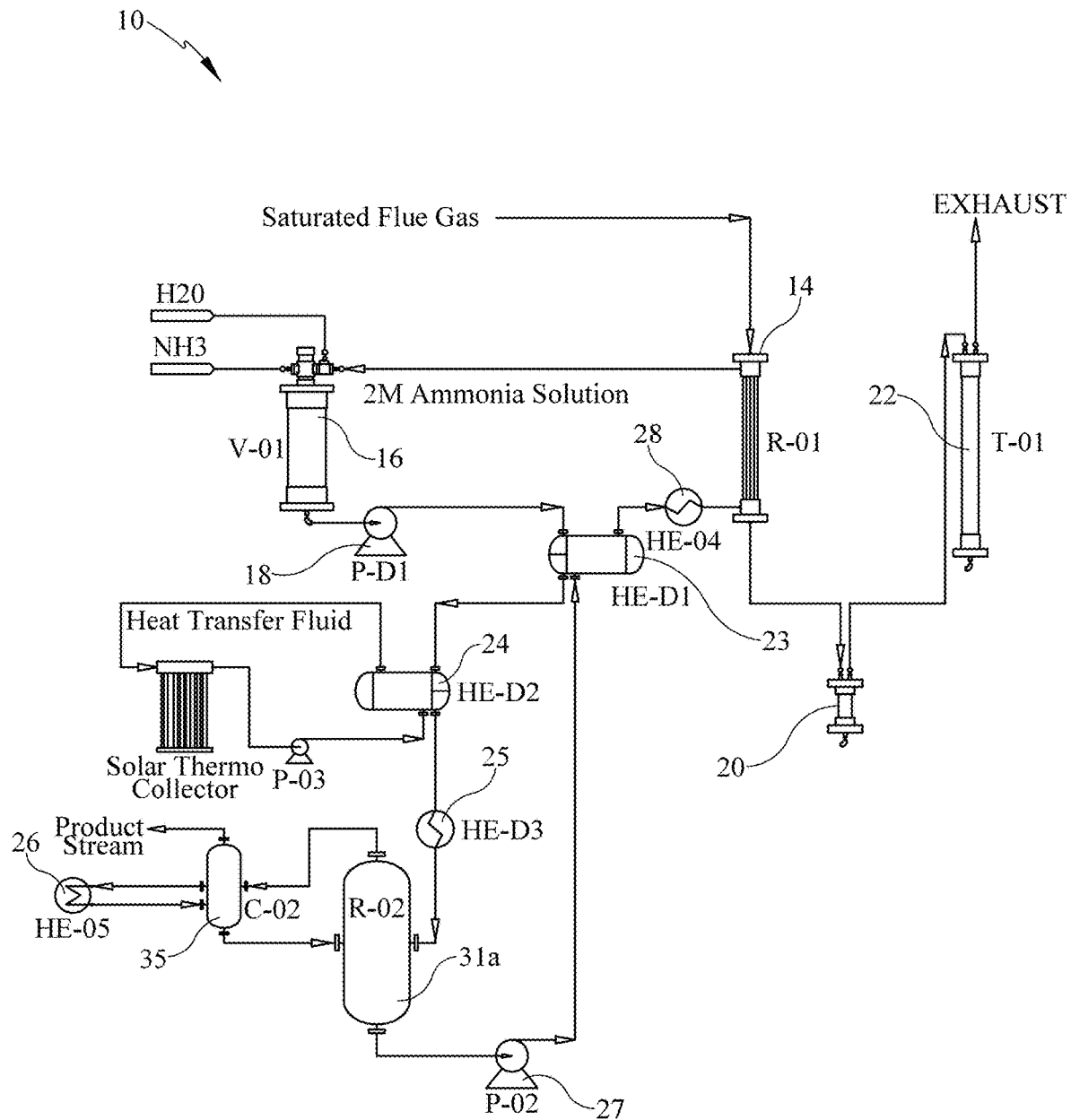
FIG. 8 is another schematic diagram of the exemplary $CO_2$ capture and fixation system of FIG. 1.

FIGS. 1 and 8 are schematic diagrams of an exemplary $CO_2$ capture and utilization system (or system) 10 made in accordance with the present invention.

Figure 2:
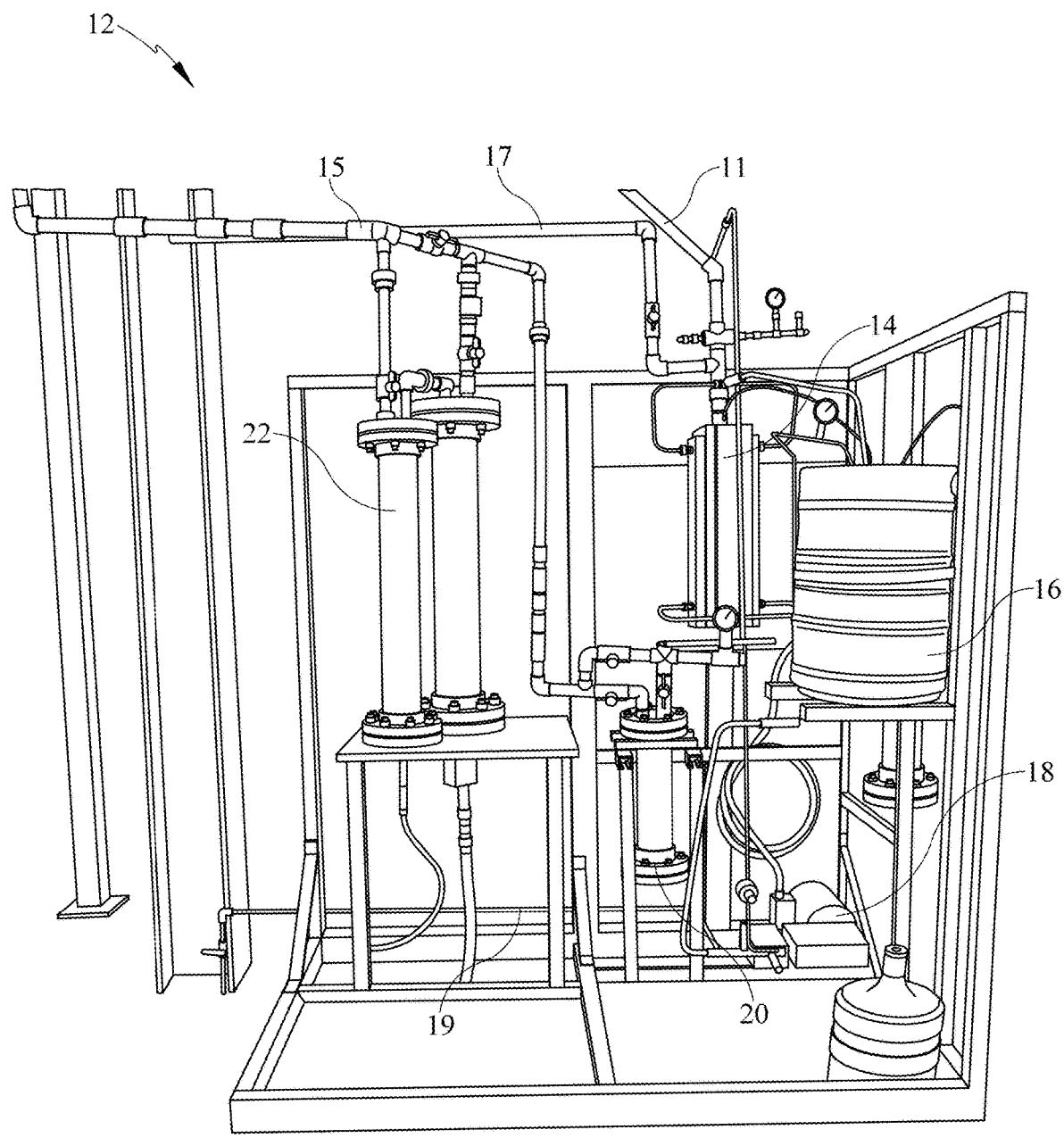
FIG. 2 is an image of a $CO_2$ capture unit of the exemplary $CO_2$ capture and fixation system of FIG. 1.

FIG. 2 is an image of a $CO_2$ capture unit 12 of the exemplary system 10 of FIG. 1.

Referring now to FIGS. 1, 2, and 8, the system 10 generally includes: a $CO_2$ capture unit 12 (identified as "$CO_2$ Capture Block" in FIG. 1) configured to capture $CO_2$ from flue gas introduced into the system 10 from an industrial facility; and a utilization unit 30 (identified as "Utilization Block" in FIG. 1) which is in fluid communication with the $CO_2$ capture unit 12, and which utilizes the $CO_2$ captured from the incoming flue gas to improve algae production. As shown, the $CO_2$ capture unit 12 is positioned downstream of, and configured to receive flue gas from, an industrial facility 5 (e.g., a coal- or natural gas-fired power plant), preferably in a saturated condition. In this regard, the $CO_2$ capture unit 12 includes a membrane $CO_2$ absorber 14 that is in fluid communication with a flue gas-emitting component of the industrial facility 5, such as sulfide dioxide ($SO_2$) scrubber 7 (FIG. 1), in this case via conduit 11 (FIG. 1). As shown in FIG. 2, the conduit 11 supplying the inflow of flue gas from the industrial facility 5 and the membrane $CO_2$ absorber 14 are oriented within the $CO_2$ capture unit 12 and relative to each other, such that a downflow of flue gas is emitted into the membrane $CO_2$ absorber 14 while the system 10 is in use. Subsequent to the flue gas entering the membrane $CO_2$ absorber 14, the flue gas contacts a solvent within the membrane $CO_2$ absorber 14 in a manner which enriches the solvent with $CO_2$ from the flue gas. In this exemplary embodiment, the solvent is an ammonium solvent and the membrane $CO_2$ absorber 14 is a gas-liquid, indirect contact membrane, such that, after entering the membrane $CO_2$ absorber 14, the downflow of flue gas indirectly contacts the ammonium solvent. That is, the membrane $CO_2$ absorber 14 prevents the ammonium solvent and flue gas from contacting each other directly, but permits $CO_2$ within the flue gas to pass through a membrane of the membrane $CO_2$ absorber 14 to interact with the ammonium solvent. Specifically, in this exemplary embodiment, the ammonium solvent is aqueous ammonia with an ammonium hydroxide ($NH_4OH$) concentration of about 3-4 wt % and has a carbon/nitrogen mol (C/N mol) loading of about 0.3 to 0.4 C/N mol. Typically, following the absorption of $CO_2$ from the flue gas, the aqueous ammonium solvent (i.e., the $CO_2$-rich solvent) will still have an $NH_4OH$ concentration of about 3-4 wt %, but there will be more bicarbonate ($HCO_3$) and carbonate ($NH_4CO_3$) species present in the solvent and will have a higher carbon/nitrogen mol (C/N mol) loading of about 0.5 to 0.7 mol depending on the $CO_2$ capture efficiency. In some embodiments, a chelating compound, such as triethylene glycol di-2-ethylhexoate (TGDE), amino trimethylene phosphonic acid (AMP), tris(hydroxymethyl)aminomethane (Tris) or a chelating compound including zinc, such as $ZnCl_2$, is utilized within the ammonium solvent to reduce $NH_3$ slip. In some embodiments, the inclusion of the chelating compound reduces $NH_3$ by approximately 20% as compared to a control solvent of the same composition except for the presence of the chelating agent.

Figure 3:
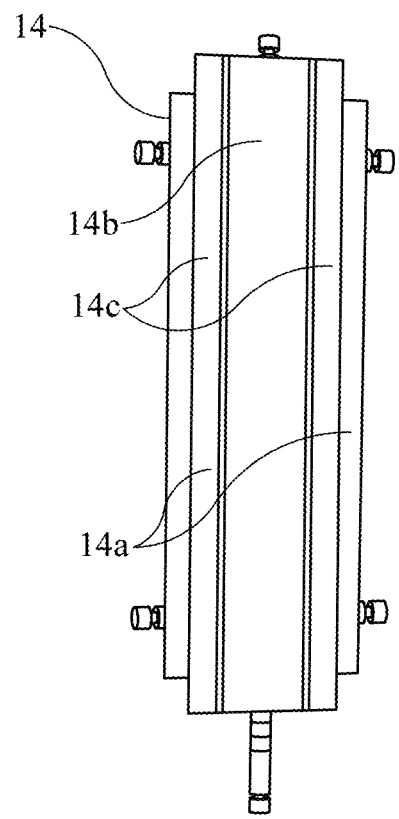
FIG. 3 is an image of a membrane $CO_2$ absorber of the $CO_2$ capture unit of FIG. 2 in isolation.

FIG. 3 is an image of the membrane $CO_2$ absorber 14 of the $CO_2$ capture unit of FIG. 2, which, in this case is a Sterlitecth® PTFE membrane.

Figure 4:
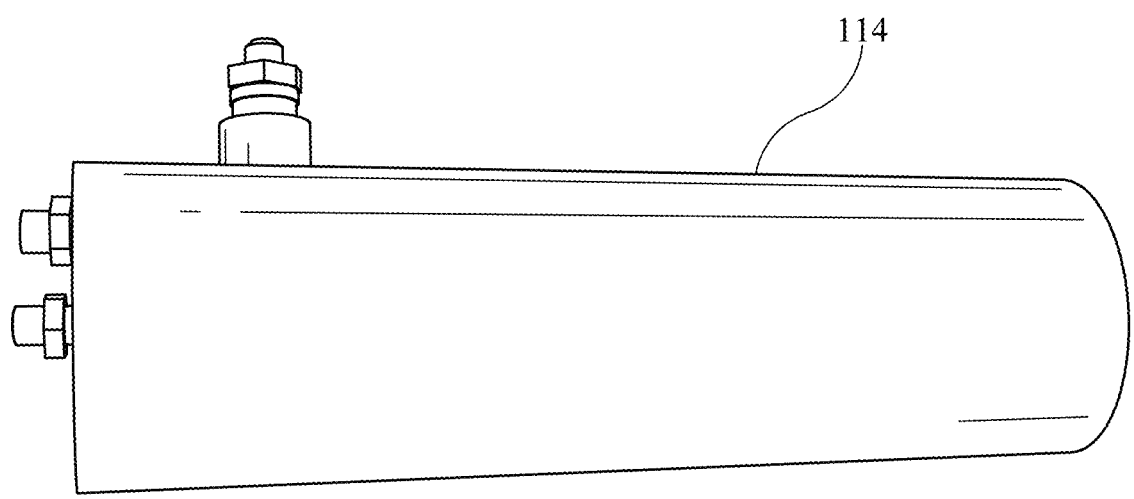
FIG. 4 is an image of a first alternative membrane $CO_2$ absorber which may be utilized in the $CO_2$ capture unit of FIG. 2 in place of the membrane $CO_2$ absorber of FIG. 3.
Figure 5:
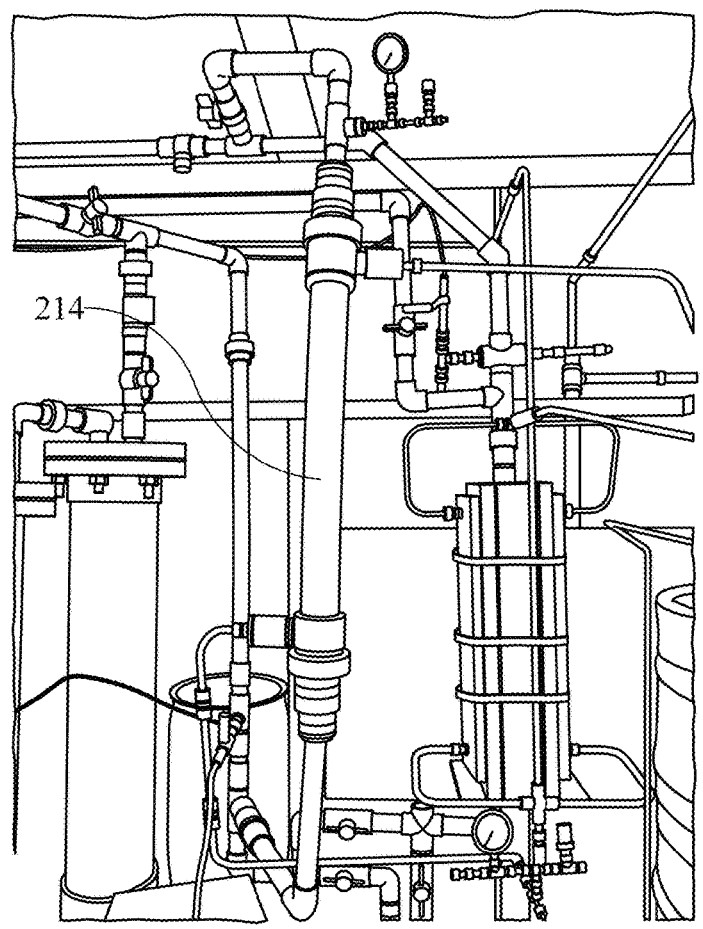
FIG. 5 is an annotated image of a second alternative membrane $CO_2$ absorber which may be utilized in the $CO_2$ capture unit of FIG. 2 in place of the membrane $CO_2$ absorber of FIG. 3.

FIGS. 4 and 5 are images of a first alternative membrane 114 and a second alternative membrane 214, which may be used in place of the membrane $CO_2$ absorber 14 of FIG. 3 in the $CO_2$ capture unit of FIG. 2.

Referring now to FIGS. 1-3, in this exemplary embodiment, the membrane $CO_2$ absorber 14 is a flat sheet membrane, which includes one or more liquid phase sections 14a through which the ammonium solvent passes, a gas phase section 14b in which the flue gas is received, and one or more membrane sections (or membranes) 14c positioned in between the one or more liquid phase sections 14a and the gas phase section 14b. Specifically, in this exemplary embodiment, the membrane $CO_2$ absorber 14 is a polytetrafluoroethylene (PTFE) membrane manufactured by Sterlitech®, which includes two liquid phase sections 14a and two membrane sections 14c. In some embodiments, each membrane section 14c of the membrane $CO_2$ absorber 14 may include polyethersulfone (PES), polyethylene terephthalate (PET), polytetrafluroethylene (PTFE), or combinations thereof. It should be appreciated, however, that the membrane $CO_2$ absorber 14 is not necessarily limited to a flat sheet membrane of the construction described above. For instance, in alternatives embodiments, a hollow fiber membrane, such as a non-porous polymer (e.g., a fluoride material) with a microporous hollow fiber support (e.g., polyether ether ketone (PEEK) membrane 114 (FIG. 4) or a MICRODYN membrane 214 (FIG. 5), may be used.

Referring now again to FIGS. 1, 2, and 8 $NH_3$ slip occurring as a result of the solvent moving from the liquid side to the gas side of the membrane $CO_2$ absorber 14 can react with $SO_2$ and $CO_2$ present in the flue gas, causing salts to form. However, as a result of the flue gas entering the system 10 being introduced into the membrane $CO_2$ absorber 14 in a downflow and saturated condition, condensate is formed from the flue gas and continuously washes the gas-side section of the one or more membrane sections 14c, thus removing any salt species, such as ammonium sulfate and ammonium carbonate, formed as a result of $NH_3$ slip from building upon the membrane and enabling long-term operation of the membrane $CO_2$ absorber 14 and $CO_2$ capture unit 12. The foregoing washing action thus eliminates the need for flue gas pretreatment for cooling (for maintaining water balance) and $SO_2$ removal (for reducing the thermal stable salt formation), which is typically required in known $CO_2$ capture and utilization systems. By eliminating the need for such flue gas pretreatment, the system 10 of the present disclosure, in turn, also effectively reduces the capital costs associated with $CO_2$ capture from flue gas as compared to that of known $CO_2$ capture and utilization systems. Furthermore, in this exemplary embodiment, the condensed water including the dissolved salt species from $NH_3$ slip is collected within a condensate trap 20, which is in fluid communication and downstream of the membrane $CO_2$ absorber 14. In addition to the membrane $CO_2$ absorber 14, the condensate trap 20 is also in fluid communication with one or more cultivation subsystems 32a, 32b (FIG. 1), the importance of which is further described below.

Referring still to FIGS. 1, 2, and 8, in this exemplary embodiment, to reduce or eliminate the release of $NH_3$ into the atmosphere, the treated flue gas (i.e., the flue gas having passed through the membrane $CO_2$ absorber 14) is routed through an acid tower 22 configured to remove any $NH_3$ in the treated flue gas prior to being exhausted into the atmosphere via induced fan 13 and conduit 15.

Figure 6A:
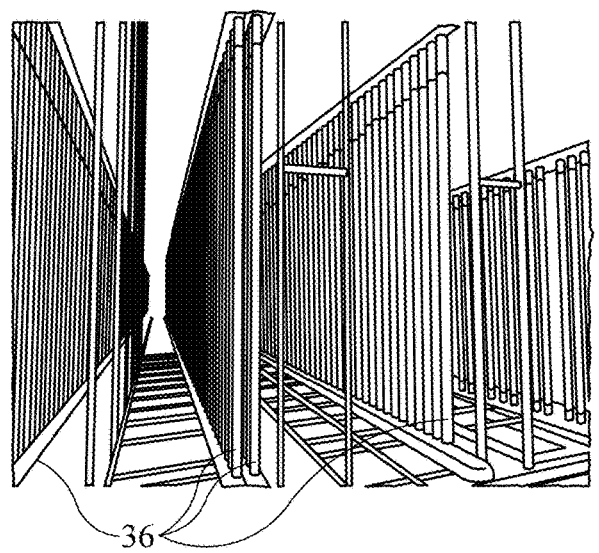
FIGS. 6A-6B are images of two cyclic flow photobioreactors (PBRs) which can be utilized in a utilization unit of the exemplary $CO_2$ capture and fixation system of FIG. 1. (A) 100,000 L cyclic flow PBR. (B) 1,200 L cyclic flow PBR.
Figure 6B:
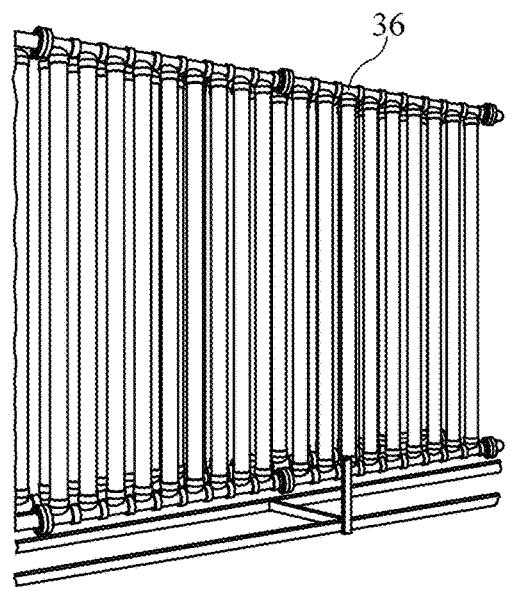

FIGS. 6A and 6B are various images of example photobioreactors (PBRs) 36 which may be utilized in the utilization unit 30 of the system 10.

Figure 7:
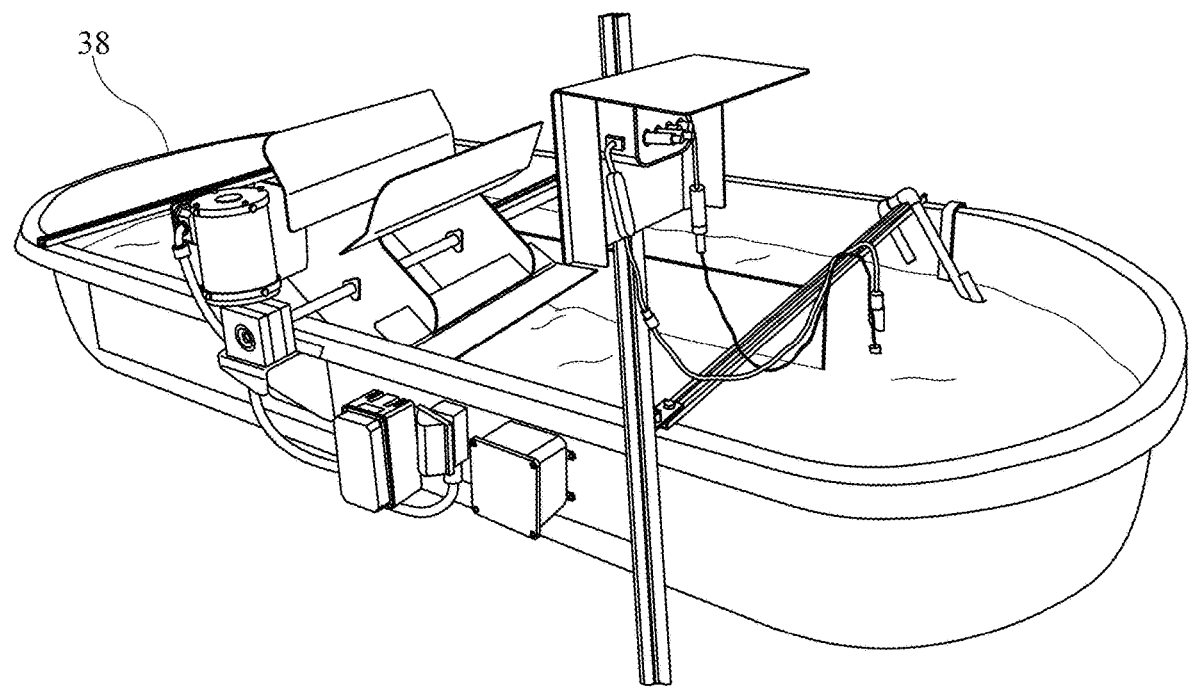
FIG. 7 is an image of a 1,100 L open raceway pond which can be utilized in the utilization unit of the exemplary $CO_2$ capture and fixation system of FIG. 1.

FIG. 7 is an image of an example open raceway pond (ORP) 38 which may be utilized in the utilization unit 30 of the system 10.

Referring now again to FIGS. 1, 2, 6A, 6B, 7 and 8, $CO_2$-rich solvent resulting from the interaction between the ammonium solvent and flue gas within the membrane $CO_2$ absorber 14 is directed from the $CO_2$ capture unit 12 and to the utilization unit 30 for subsequent processing. Specifically, in this exemplary embodiment, the $CO_2$-rich solvent is processed by the utilization unit 30 as to produce (i) a solvent stream which can be recirculated back to and reused within the membrane $CO_2$ absorber 14 and (ii) a product stream containing $CO_2$ captured from the flue gas and volatized $NH_3$ from the solvent, which can be provided in a predetermined $CO_2$:$NH_3$ ratio to one or more cultivation subsystems 32a, 32b (FIG. 1) within the utilization unit 30 containing one or more species of algae, such as *Scenedesmus acutus* (UTEX B72), to enhance algae production. To this end, the utilization unit 30 thus includes one or more solvent regenerators (or strippers) 31a, 31b for solvent regeneration, such as flash/matrix stirppers, which are configured to process the $CO_2$-rich solvent to produce the product stream and are in fluid communication with one or more cultivation subsystems 32a, 32b, such that the product stream produced by each respective stripper 31a, 31b is provided to the cultivation subsystem 32a, 32b to which it is in fluid communication with. As shown in FIG. 1, each stripper 31a, 31b may be solar powered and, to this end, operably connected to a solar cell 33a, 33b to eliminate the need for steam extraction during the solvent regeneration process, thus further reducing the capital cost associated with $CO_2$ capture from the flue gas relative to known systems. Each cultivation subsystem 32a, 32b can comprise one or more PBRs 36 (FIGS. 6A and 6B) and/or one or more ORPs 38 (FIG. 7). Each stripper 31a, 31b is preferably installed near the cultivation subsystem 32a, 32b to which it corresponds to provide continuous just-in-time distribution of $CO_2$:$NH_3$. The product stream is produced by each respective stripper 31a, 31b is a result of the stripper 31a, 31b heating and pressurizing the $CO_2$-rich solvent contained therein. In this regard, the $CO_2$:$NH_3$ ratio in of the product stream produced by each respective stripper 31a, 31b can be adjusted and controlled by adjusting the stripper pressure and the stripper exit temperature. In some embodiments, each respective stripper 31a, 31b is configured to deliver a product stream with a $CO_2$:$NH_3$ molar ratio of about 7 to about 16. In some embodiments, each respective stripper 31a, 31b is configured to deliver a product stream with a $CO_2$:$NH_3$ molar ratio of about 10.

As evidenced above, the ammonium solvent utilized within the system 10 thus acts as both a $CO_2$ capture agent within the $CO_2$ capture unit 12 and as a N nutrient for algae growth in the utilization unit 30. In one preferred embodiment, each respective stripper 31a, 31b is configured to deliver a product stream with a $CO_2$:$NH_3$ molar ratio of about 10. The continuous feed of $CO_2$ and $NH_3$ to the cultivation subsystems 32a, 32b serves to overcome typical algae growth inhibition problems commonly occurring in $CO_2$ capture and utilization systems of known construction due to frequent pH swings in the cultivation unit resulting from unbalanced (intermittent) feeding of $CO_2$ and nitrogen (N). Accordingly, in this way, the continuous feed of $CO_2$ and $NH_3$ also provides enhanced algae growth relative to such systems. Furthermore, due to the proximity between the regenerator and the cultivation subsystem, the risk of pressure drop when sparging gas into the algae is significantly reduced.

As shown in FIG. 1, to further promote algae growth, in this exemplary embodiment, the condensed water with dissolved salt species collected within the condensate trap 20 is pumped, via pump 21 to the one or more cultivation subsystems 32a, 32b.

Referring now specifically to FIGS. 1 and 8, following solvent regeneration, the ammonium solvent will typically have a $NH_4OH$ concentration that is less than 3-4 wt % due to some $NH_3$ being utilized in the product stream to feed the algae in the cultivation subsystems 32a, 32b. In this regard, following solvent regeneration, the ammonium solvent may be characterized as "lean solvent.". The lean solvent is transmitted from each stripper 31a, 31b and directed into the membrane $CO_2$ absorber 14 for use therein via conduit 17. Accordingly, in addition to a cultivation subsystem 32a, 32b, each stripper 31a, 31b is also in fluid communication with the membrane $CO_2$ absorber 14. Preferably, to bring the $NH_4OH$ concentration of the solvent back to about 3-4 wt %, a concentrated $NH_4OH$ solution is added to the lean solvent prior to being introduced into the membrane $CO_2$ absorber 14, as indicated by the introduction of $NH_3$ and coolant in FIG. 1.

Referring now specifically to FIG. 8, in this exemplary embodiment, the $CO_2$-rich solvent exiting the membrane $CO_2$ absorber 14 is circulated through the utilization unit 30, regenerated to lean solvent back to the membrane $CO_2$ absorber 14 along the below-described path. As shown, upon exiting the membrane $CO_2$ absorber 14, the $CO_2$-rich solvent is first directed into a solvent tank 16 and then pumped, via solvent circulation pump 18 and conduit 19, through first heat exchanger 23, a second heat exchanger 24, and a third heat exchanger 25 prior to being introduced into cultivation subsystem 32a for solvent regeneration. The solvent tank 16 helps to ensure a smooth continuous flow of solvent and that the solvent circulation pump 18 does not run dry. In this exemplary embodiment, the second heat exchanger 24 is regulated by a solar thermo collector. Stripper 31a then directs the solvent into a condenser 35 which is regulated by a fifth heat exchanger 29. The condenser 35 releases a predetermined ratio of $CO_2/NH_3$ as a product stream to cultivation unit and the resulting condensate (i.e., the lean solvent) is returned to stripper 31a. In this regard, the condenser 35 may be a component of stripper 31a or a separate component which supplements operation of stripper 31a. The lean solvent is then pumped via pump 27 back to the first heat exchanger 23 via pump 27. The lean solvent is then directed from the first heat exchanger 23 through a fourth heat exchanger 28 and into the membrane $CO_2$ absorber 14. However, as noted above, a concentrated $NH_4OH$ solution is preferably added to the lean solvent prior to being introduced into the membrane $CO_2$ absorber 14. Although stripper 31b is not shown in FIG. 8, it is appreciated that the $CO_2$-rich solvent would be, in this exemplary embodiment, delivered to, processed by, and returned from stripper 31b in the same manner as described above for stripper 31a.

Referring now specifically to FIG. 1, in this exemplary embodiment, the utilization unit 30 includes two strippers 31a, 31b (one of which is shown in FIG. 8) and two corresponding cultivation subsystems 32a, 32b (neither of which is shown in FIG. 8). Of course, the system 10 is not limited to such configuration. In this regard, embodiments are contemplated in which only a single stripper and corresponding cultivation subsystem are utilized within the utilization unit 30 as well as embodiments in which more than two strippers and corresponding cultivation subsystems are utilized.

Also provided herein is a method of capturing and utilizing $CO_2$, which utilizes the above-described system 10. The method of capturing and utilizing $CO_2$ thus includes method steps which reflect the operation of, functionality provided by, and/or effects resulting from use of the above-described system 10, either as a whole or by individual components thereof. Accordingly, to avoid excessive repetition, where reference is made to the above-described $CO_2$ capture and utilization system or a specific component thereof as providing some function or operation, it is understood that the method of capturing and utilizing $CO_2$ includes, at least in some embodiments, a method step which reflects such function or operation. Accordingly, in some embodiments, the method of capturing and utilizing $CO_2$ provided herein may include the use of some or all of the components of the above-described system 10. Unless specified or context precludes otherwise, the various method steps may be carried out in any order.

Like algae, cyanobacteria are similarly able to fixate captured $CO_2$ and utilize nitrogen as a nutrient source. Accordingly, although discussed herein primarily with respect to providing enhanced algae growth, one of ordinary skill in the art will appreciate that, in some embodiments or implementations, one or more species of cyanobacteria may alternatively be used in place of algae to fixate $CO_2$ within the system 10 and method described herein without departing from the spirit or scope of the present invention.

The presently-disclosed subject matter is further illustrated by the following specific but non-limiting examples. The following examples may include compilations of data that are representative of data gathered at various times during the course of development and experimentation related to the presently-disclosed subject matter. Those skilled in the art will recognize, or be able to ascertain, using no more than routine experimentation, numerous equivalents to the specific substances and procedures described herein.

EXAMPLES

Example 1

Ammonium Looping with Membrane Absorber and Distributed Stripper for Enhanced Algae Growth The present $NH_3$-based looping integrated $CO_2$ capture and utilization system (FIGS. 1 and 8) described herein reduces capture capital and operating costs by 50% by eliminating flue gas pretreatment for cooling/$SO_2$ removal, steam extraction for solvent regeneration and $CO_2$ compression. It also boosts algae production by 50% by continuously supplying $CO_2$ and $NH_3$ in the appropriate growth ratio, compared to intermittent, decoupled feeding systems. To these ends, the current system includes at least three features which are unique to the present $CO_2$ capture and utilization system. First, the system utilizes a thermally- and oxidatively-stable, dual-function, $NH_3$ reagent that is both the $CO_2$ capture absorbent and an algae nutrient. Second, the system utilizes a downward flow, gas-liquid, indirect contact membrane $CO_2$ absorber, where the capture and biofixation is decoupled and $NH_3$ slip is minimized by including a chelating compound in the ammonium solvent. Condensate from incoming saturated flue gas continually washes the gas side of the absorber to ensure long-term operation. Third, carbon-rich solvent distributed regenerators installed near algae cultivation units to provide local, just-in-time distribution of $CO_2$ and $NH_3$ at the appropriate ratio boosting algae production. Solvent regeneration is powered by solar-thermal energy, thus eliminating the need for steam extraction.

Reduced Cost of $CO_2$ Captured to Cultivation Unit. Approximately 25% of the cost of aqueous post-combustion (PC) $CO_2$ capture is associated with flue gas pretreatment, steam extraction, and $CO_2$ compression, which are all eliminated by the current $CO_2$ capture and utilization system. Advantage is taken of the flue gas condensate in the indirect-contact low-thermally conducting membrane $CO_2$ absorber (FIGS. 1, 2, and 8), eliminating the need for a cooling (for maintaining the water balance in the typical aqueous systems) and $SO_2$ removal pretreatment (for reducing the thermal stable salt formation in the conventional aqueous systems) step. Ammonium solvent regeneration is powered by solar energy, thus eliminating the need for steam extraction. The integrated solvent regenerator with cultivation unit (e.g., photobioreactor or open raceway pond) eliminates the need to compress a $CO_2$ product stream. A preliminary techno-economic analysis (TEA) conducted by Colorado State University has indicated that 20-50% of the cost of algae production is from $CO_2$ cost and distribution depending on the source (coal or natural gas (NG), respectively), the way $CO_2$ is supplied and the distance transported.

Dual-Functional $NH_3$ Looping. To reduce $NH_3$ emissions, $NH_3$ slip within the system is managed in three ways. First, a carbon-loaded low concentration ammonium solvent (e.g., a 2M $NH_3$ solvent) with additives is employed to lower the $NH_3$ vapor pressure. The species partial pressure is proportional to the concentration in the liquid. Hence, lowering the concentration will lower the partial pressure. Additionally, previous work has demonstrated that the addition of $Zn^{2+}$ into ammonium solvents to chelate the $NH_3$ can reduce $NH_3$ volatility. Second, a downflow flue gas configuration is utilized due to the fact that flue gas is entering the membrane $CO_2$ absorber at a saturated condition, forming liquid film along the membrane wall due to heat transfer. Experiments performed using water-saturated simulated flue gas showed a benefit to anti-fouling and $NH_3$ slip recapture from the water condensate liquid phase formed on the gas-side of the membrane. The downflow orientation also allows the condensate to continuously wash ammonium salts from the membrane surface when formed. The collected condensate is fed to the algae as makeup water and supplemental nutrients. Third, a nanoporous, dense membrane is utilized. In an effort to reduce $NH_3$ slip, a set of chemically resistant composite fibers have been utilized, made of a thin dense layer that is highly permeable to $CO_2$ but less permeable to $NH_3$. It was found that fluorinated polymers are effective for this purpose by increasing the $NH_3$ mass transfer resistance. Further development of the membrane material may be conducted to depress the $NH_3$ permeability. Optional coatings and membrane materials may, in some instances, be considered with higher $CO_2$ permeabilities than $NH_3$, such as polydimethylsiloxne (PDMS), TPX®, or Teflon AF2400®.

Preferable Growth Media with Just-in-Time C:N Delivery at Appropriate Ratio. In the regenerators, the amount of $CO_2$ and $NH_3$ in the resulting product stream is adjusted and controlled by a combination of the stripper pressure and stripper exit temperature. In the system, a pressure of 50 psi and a temperature of 135° F. after the overhead condenser should deliver a product stream with C:N molar ratio of ~7, as required by the algae culture. The direct connection between the regenerator and the cultivation unit will avoid long distance delivery, and reduce associated capital and gas compression cost. Algae biomass typically contains 45-50% C, 7-8% N, and 1.4% P, varying according to species and growth conditions. Numerous studies have suggested that the effects of N on algae production and composition may depend on the source and chemical composition of N added to the growth medium. Additionally, the thermally compressed $CO_2/NH_3$ stream from the stripper will facilitate sparging of this stream into the cultivation units for high $CO_2$ utilization efficiency.

Disruptions of $CO_2$ Original Source. The ammonium solvent loop of the current technology can continue to circulate with regeneration occurring for short periods during interruption of the flue gas supply. In this case, the solvent is over-stripped, but the algae feed will remain continuous.

Control of $NH_3$ slip. First, according to thermodynamics, the gaseous partial pressure of a species is proportional to the molar ratio of the species in the solution, in this application, dissolved $NH_3$; hence, a low dissolved $NH_3$ concentration in the $CO_2$ capture solvent via zinc chelating (expressed in Table 1) and the presence of carbon species (carbonate and bicarbonate) will depress the $NH_3$ partial pressure that is the driving force for slip to the gas-side of the membrane. Second, 30-50 ppm $SO_2$ present in flue gas could react with $NH_3$, in a similar pathway as $CO_2$, if $NH_3$ slips to form ammonium sulfate or sulfite for further flue gas SOx reduction, with the salts dissolving in the liquid condensate from the saturated flue gas after wet flue gas desulfurization (WFGD).

TABLE 1

Chelation, $CO_2$ Capture and Regeneration Reactions.

Figure 9:
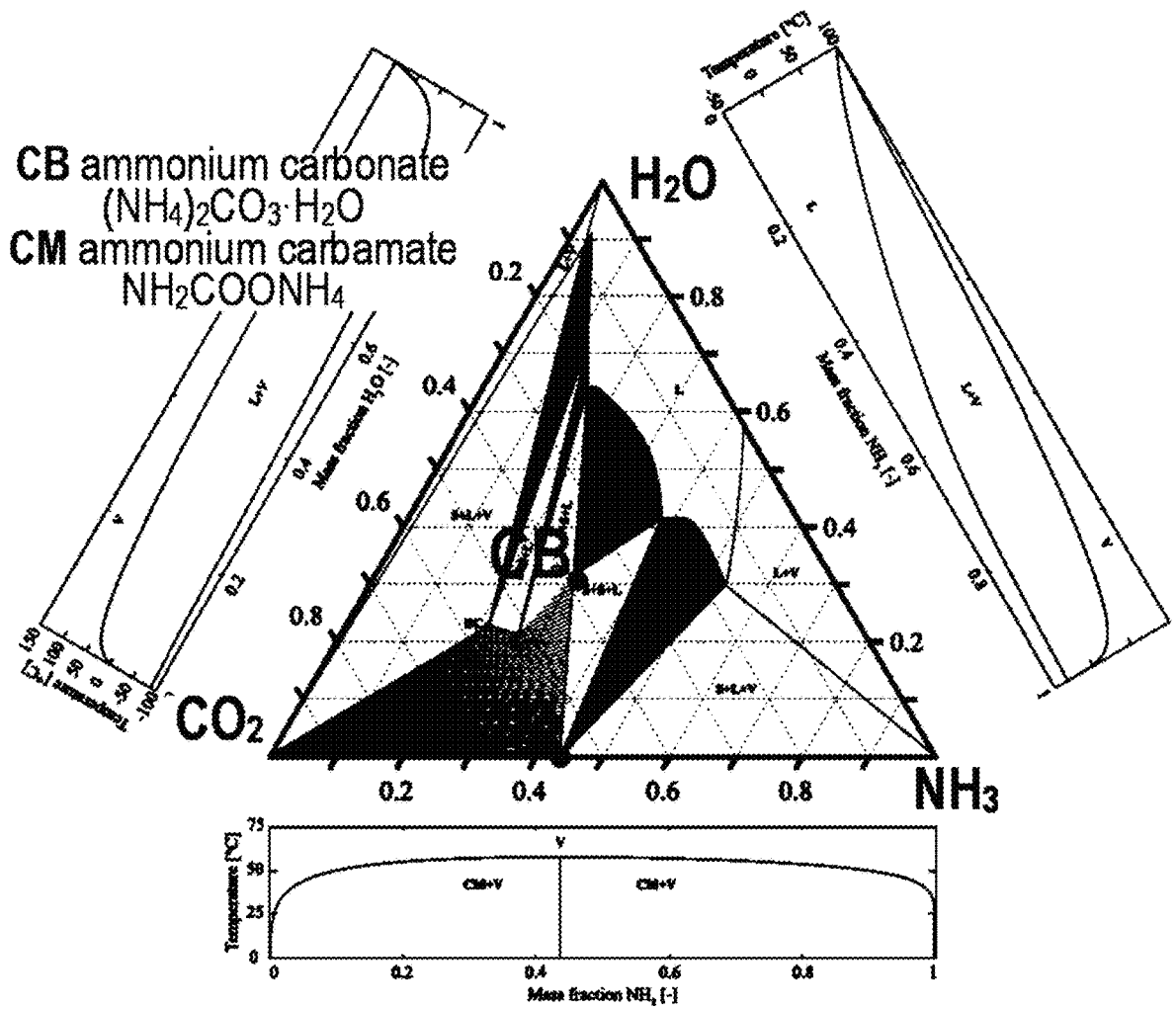
FIG. 9 is a $NH_3$—$CO_2$—$H_2O$ ternary phase diagram.[9]

$Zn^{2+} + 4NH_3 \leftrightarrow [Zn(NH_3)_4]^{2+}$
$CO_2 + H_2O \leftrightarrow HCO_3^- + H^+$
$NH_3 + H_2O \leftrightarrow NH_4^+ + OH^-$
$[Zn(NH_3)_4]^{2+} + HCO_3^- \leftrightarrow [Zn(NH_2COO)_2]_2 + 2NH_3 + 2H_2O$
$2NH_3 + CO_2 + H_2O \leftrightarrow (NH_4)_2CO_3$ In-situ Antifouling. As evidenced in the $NH_3$—$CO_2$—$H_2O$ ternary phase diagram shown in FIG. 9, ammonium carbamate, a sticky solid, is the only product between $NH_3$ and $CO_2$ in the absence of water. However, non-sticky ammonium carbonate, a compound that is very soluble in water, is formed at a saturated gas condition when the $CO_2$ concentration is much higher than the $NH_3$ concentration, as it exists in the proposed scenario. Downflow condensed water from the saturated flue gas in the application of coal-fired power plant (FIG. 1) will continuously dissolve and wash away the $NH_4^+$ salts as they form and prevent fouling of the membrane. For application at a NG power plant, periodically sprayed water on the membrane wall is required to clean the salts.

Enhanced Algae Growth. Algae is less productive when under chemical stress, which is the practical case resulting from intermittent intake of $NH_4^+$, $HCO_3^-$ and $CO_3^{2-}$, or when there is an imbalance in the C:N ratio in the algae growth medium, as shown in Table 2. At high C:N ratios, consumption of N by the culture (in parallel with $CO_2$ consumption) will result in a pH decrease, whereas at low C:N ratios the pH increases. Hence, there is a strong incentive to target the stoichiometric C:N ratio in the solution fed to the culture to minimize fluctuations in pH. To address this, distributed solvent regenerators are operated individually to deliver just-in-time $CO_2$ and $NH_3$ to the cultivation unit as needed and at the appropriate ratio. Given that the molar C:N ratio of rich $NH_4^+$ solution exiting the membrane contactor is 0.5 (corresponding to ammonium carbonate) without any regeneration, and 147 when the regenerator outlet is set at 210° F. and 59 psi, the stoichiometric C:N ratio (~7) for *Scenedesmus acutus* (UTEX B72), the algae strain to be used in the current example, is readily achieved by adjusting the stripper pressure and exhaust temperature.

TABLE 2

$NH_3$ and $CO_2$ Consumption.

$NH_4^+$ consumption-excess $CO_2$ present ($NH_4^+$ limiting):
$(NH_4)_2CO_3 \rightarrow \rightarrow H_2CO_3$; $NH_4HCO_3 \rightarrow \rightarrow H_2CO_3$
$CO_2$ consumption-excess $NH_4^+$ present ($CO_2$ limiting):
$(NH_4)_2CO_3 + H_2O \rightarrow \rightarrow 2NH_4OH$; $NH_4HCO_3 \rightarrow \rightarrow NH_4OH$ Algae Growth and Integrated Regeneration by Solar Energy. The algae production rate for UTEX B72 depends on the geological location and cultivation system. In Kentucky (KY), the University of Kentucky Center for Applied Energy Research (UK CAER) has achieved productivity of 35 g m$^{-2}$ day$^{-1}$ (dry weight basis) under optimum climatic conditions (cultivation May-September) using a tubular PBR with intermittent $CO_2$ feeding based on culture pH. For ORPs, areal productivities are much lower. For example, for UTEX B72 grown in KY in September-October 2018, fed with $CO_2$ on an open loop (no pH control), measured areal productivity averaged 4.8 g m$^{-2}$ day$^{-1}$. With the continuous, just-in-time $CO_2$ and $NH_3$ delivery to the cultivation unit to minimize the culture pH swing, significant improvement in productivity (at least 50%) can be achieved. This stems not only from the advantage of operating with improved pH control and an optimized C:N ratio, but also from the standpoint of reduced culture contamination. By maintaining constant basic conditions in the culture, rather than feeding gaseous $CO_2$ which typically results in operational pH values of 7 or less, since $CO_2$ dissolves in water to form carbonic acid, invasive organisms are less able to establish themselves in the culture, resulting in reduced instances of culture crashes and improved productivity. In both ORPs and PBRs, pests ranging from grazers to parasites can quickly invade and decrease productivity and yield or decimate entire crops. Although there is no one-size-fits-all approach, increasing the culture pH represents one of the simplest and most effective treatment options, providing the algae strain is sufficiently robust to alkaline conditions.

It should be noted that while ORPs are inherently less productive than PBRs, they are the preferred cultivation system for large-scale algae production due to their significantly lower capital cost. Albeit PBRs do possess specific advantages over ORPs and are preferred for niche applications (high-value, low-volume products), the current system preferably utilizes ORPs as the cultivation unit due to anticipated application of massive power generation.

Finally, it should be noted that based on the annual solar intensity of 5 kWh/m$^2$-day in KY and the heat of regeneration of 120 kJ/mol $CO_2$ (10 kJ/gram C), 50% of algae as C and 50% $CO_2$ utilization efficiency in the reactor to produce a targeted max. 50 gram/m$^2$-day, the footprint to collect sufficient solar energy (500 kJ) to heat the rich solvent for $CO_2$ and $NH_3$ supply is about 0.028 m$^2$, which is only 2.8% of the cultivation unit footprint as the upper limit. Hence, solvent regeneration powered by solar energy is feasible.

Typical sources of $CO_2$ considered for algae cultivation are waste streams from power or chemical plants. These sources range in concentration from low (3-5 vol %, 12-15 vol % and 20-25 vol % for natural gas-fired power plants, coal-fired power plants, and cement plants, respectively) to high (99 wt % for ethanol, $NH_3$, or hydrogen plants). Assuming the algae farm is co-located with the $CO_2$ source, two scenarios for introducing $CO_2$ into algae cultures and three cases of $CO_2$ sources were considered for a preliminary economic analysis. The two $CO_2$ delivery methods considered were: 1) compression and subsequent bubbling of the gas directly into the algae growth system; and 2) producing a concentrated aqueous stream saturated or supersaturated with dissolved C. Assuming the chemical $CO_2$ is free of charge, the cost of $CO_2$ with the first delivery option (direct use) derives just from the auxiliary power and balance of the plant associated with compression, transportation and distribution, while the cost of $CO_2$ with the second delivery option (aqueous stream) covers the capital and operational cost associated with $CO_2$ separation/enrichment, as well as transportation and distribution.

Figure 10:
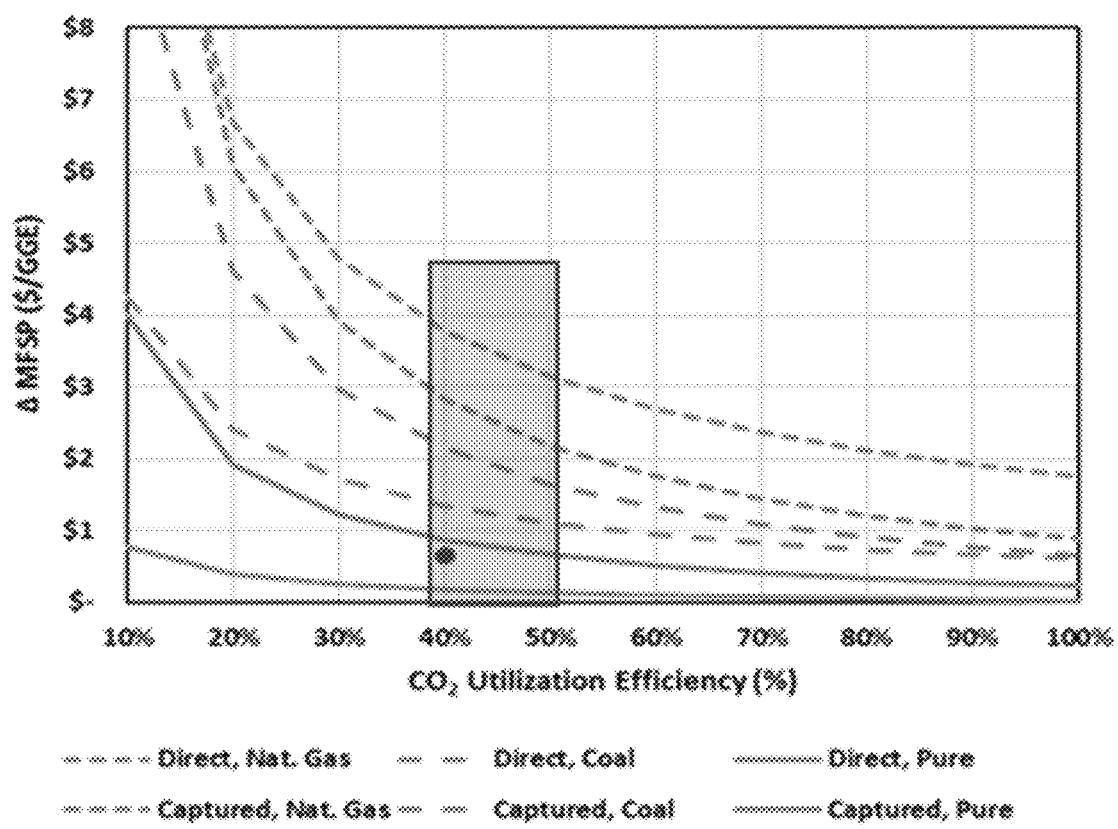
FIG. 10 is a graph showing the minimum fuel selling price (MFSP) in dollars per gallon gas equivalent (GGE) change for various $CO_2$ sources. All cases assume co-location with the microalgae facility, and algae productivity of 25 g m$^{-2}$ day$^{-1}$.[13] The blue shaded area shows the optimal bioreactor utilization efficiency of 40-50%, to balance the capital and operational cost of the algae system if compression and distribution of the $CO_2$ source is required. The red point is the MFSP for $CO_2$ from a coal-fired power plant achievable with the exemplary $CO_2$ capture and fixation system.

UK CAER past experience has concluded that utilization efficiencies of 40-50% are optimal to balance the capital and operational cost of the algae system if compression and distribution of the $CO_2$ source is required. As anticipated, utilizing a dilute $CO_2$ source requires much higher reselling price (RSP) to achieve economic sustainability (FIG. 10).[13] For instance, at 40% $CO_2$ utilization efficiency in the cultivation unit, direct use of $CO_2$ in flue gas produced from NG combustion (5 vol % $CO_2$) equates to $3.9/gasoline gallon equivalent (GGE), compared to $1.5/GGE needed for coal flue gas (13.5 vol %) and less than $0.2/GGE for ethanol plants or chemical plants due to high capital and operational cost being required to deliver dilute $CO_2$ to the algae culture. On the other hand, enriching $CO_2$ from flue gas to 99$^+$% purity could reduce the transport and distribution costs associated with the pure $CO_2$; however, the cost associated with $CO_2$ capture could exceed the savings. For example, with 90% $CO_2$ capture from power production, due to the C intensity of coal (Case B12B, 2190 lb/MWe-hr net),[14] $CO_2$ preconcentration results in high RSP, $2.1 versus $1.5/GGE. Contrarily, due to the low C intensity of NG (Case B31B, 850 lb/MWe-hr net), capture, transport, and distribution of pure $CO_2$, instead of compressing flue gas containing 5 vol % $CO_2$, will result in savings of ~$1 on RSP.[13]

Success of the current system can significantly reduce the cost of $CO_2$ capture, transport and distribution in four ways. First, using solar thermal energy for solvent regeneration eliminates the need for excess generation capacity (boiler, turbine and their auxiliary equipment) necessary to provide steam and electricity to the solvent regeneration unit. Direct feed of the $CO_2$ and $NH_3$ to the algae eliminates the need for the product $CO_2$ stream compression. The indirect contact between the flue gas and the aqueous capture solvent, and the low thermal conductivity of the membrane, will eliminate the need for flue gas cooling and pretreatment to prevent the accumulation of water and thermally stable salts in the capture loop. These portions of the cost in DOE/NETL Case B12B[14] are ~$700/kW in capital and $7/MWh in fuel and fixed cost. Second, the use of $NH_3$ as the capture reagent and nutrient for algae growth could reduce costs associated with solvent makeup, which account for approximately 5% of the overall cost when an advanced, second-generation solvent is used. Third, solvent pumping, transport and distribution reduces the balance of plant (BOP) cost related to the flue gas duct and boost fan. Fourth, the just-in-time $CO_2$ and $NH_3$ delivery to the cultivation unit at close to stoichiometric C:N ratio will boost algae production. A 50% reduction of RSP for $CO_2$ from coal-fired power plants is achievable, as indicated by the red dot in FIG. 10 (<$1/GGE).

The product of the system, in the present example, is a microalgae biomass. Specifically, UTEX B72 was selected as the organism of choice, due its high productivity, robust nature, and high protein content. The latter characteristic renders UTEX B72 biomass an excellent feedstock for the production of bioplastics. Our study shows that the cultivation of UTEX B72 in ORPs using power plant flue gas is commercially viable for an $n^{th}$ plant if the whole, dried biomass is used as a feedstock for the production of bioplastics with a minimum selling price of $970/tonne, which falls within the profitable feedstock price range.[12] While algae biomass could potentially be used as animal feed, bioplastics represent a more valuable application. Biomass is typically purchased for $800-$1,200/tonne, which allows for profitability in the bioplastic industry. Equally important, LCA results reveal a decrease in greenhouse gas (GHG) emissions of between 67% and 116% (cultivation system and biomass process scheme dependent) through the direct substitution of petroleum-derived plastic resins with algae-based bioplastic feedstock, showing a clear path to improve sustainability of the plastics market. Currently, around 1% of the global plastics market is occupied by bioplastics, the majority of which are made with food products. The global bioplastics market is forecast to grow at a compounded annual growth rate (CAGR) of not less than 20% over the period 2019-2024.[16] In 2019, global bioplastics production was about 2.11 million tonnes.[17] Finally, it should be noted that a variety of other products can be obtained from algae, ranging from low-value products such as fuels (economically unfeasible at present) to high-value products such as nutraceuticals and specialty foods. While such high value products are economically attractive, the small size of these markets means that they are unable to utilize significant amounts of $CO_2$.

Algae biomass from UTEX B72 typically contains 45-50% C, 7-8% N, and 1.4% P, albeit the elemental composition can vary significantly according to the species of algae and growth conditions. This composition is consistent with the Redfield molar elemental ratio (106:16:1 C:N:P) on a mass basis (40:7:1 C:N:P). Nearly 50% of the final dry product corresponds to the $CO_2$ feedstock.

The $CO_2$ capture and utilization system receives flue gas exiting an industrial facility, which, in this case, is a coal-fired plant, after WFGD, at ~125° F. (coal and plant location dependent) and 15 psi, and is comprised of 11-14 vol % $CO_2$, 5-7 vol % $O_2$, 15-17 vol % $H_2O$, <1 vol % Ar, 20-50 ppm $SO_2$, 40-60 ppm NOx, and trace amounts of metals, with the balance being $N_2$. Without concerns about condensate in the gas and thermally stable salts accumulating in the capture solvent, the flue gas enters the membrane reactor directly without the cooling/$SO_2$ polishing step required by most aqueous post-combustion systems.

Membrane $CO_2$ Absorber. Several things happen in the membrane $CO_2$ absorber. $CO_2$ and $SO_2$ in the flue gas penetrate to the liquid side, and form carbonate, bicarbonate and sulfite. In parallel, a small portion of the dissolved $NH_3$, at the ppm level, will slip from the liquid side to the gas side and could react with $SO_2$ or $CO_2$ to form salts. Adiabatic expansion cooling occurs as $CO_2$ is absorbed along the membrane, resulting in condensation of water from the flue gas. This liquid water dissolves the $NH_4^+$ salts and prevents surface fouling. The flue gas down-flow drains the liquid to the sump by gravity and prevents membrane flooding. Because aqueous $NH_3$ is not a preferred agent (compared to amines) for the accumulation of trace metals such as As, Se, and others, the heavy metals most likely will remain in the flue gas.

Figure 11:
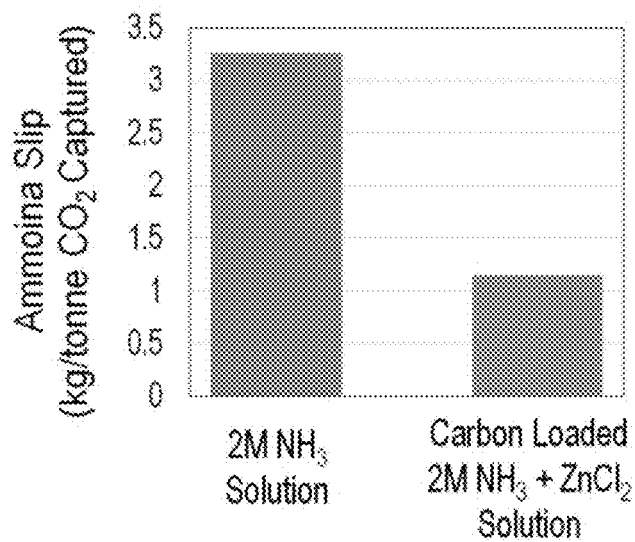
FIG. 11 is a graph showing $NH_3$ slip data of 2M $NH_3$ solution and carbon loaded 2M $NH_3$+$ZnCl_2$ solution.
Figure 12:
FIG. 12 is an annotated satellite image of a carbon capture and utilization system in which a membrane $CO_2$ absorber and solar-powered regenerators made in accordance with the present invention are implemented.

Testing of Zinc Ammonium Solvent. Zinc-ammonium solvent was tested at the UK CAER large bench $CO_2$ capture facility. ~30% reduction in $NH_3$ slip was observed with tests using ~7 wt % $NH_3$ concentration. The membrane, in this example, is a custom built membrane supplied by Compact Membrane Systems of Newport, Delaware. It is a nanoporous amorphous fluoropolymer membrane and has been demonstrated with other dissolved gas applications.[27] Preliminary study using a UK CAER bench-scale membrane device (FIG. 11) revealed that $NH_3$ slip for the proposed concentrations and chemical additives for membrane absorber is manageable and controllable (FIG. 12). $NH_3$-based solvent regeneration has been tested by UK CAER (bench), Alstom (large pilot), and SRI (bench and pilot-scales).

System Integration. The $CO_2$ capture and utilization system, in the present example, integrates UK CAER's existing $CO_2$ capture system (replacing the absorber and implementing solar-powered regenerator) and cultivation unit (FIG. 12) to demonstrate $CO_2$ capture and utilization from coal-, NG-, or other industrial-flue gas with 50% algae growth improvement and more than 20% cost reduction. Located in close proximity, these UK CAER facilities have been separately utilized for $CO_2$ capture and algae growth for many years. Replicating the commercial-scale approach, the final integrated capture and utilization UK CAER system will include real flue gas generators (coal and NG), a hydrophobic membrane $CO_2$ absorber, a packed-bed stripper, cultivation units, auxiliary pumps, $NH_3$ and water make-up systems, heat exchangers, valves, instrumentation and controls. A 2M ammonium solvent is used as both the capture agent and N nutrient for algae growth.

Process Description. The $CO_2$ capture and utilization system uses 15 cfm flue gas produced from either coal or NG combustion and a spiral-wound polymeric membrane for $CO_2$ preconcentration to simulate an industrial $CO_2$ source. Other process equipment includes: the membrane $CO_2$ absorber; solar powered regenerator, such as a flash/matrix stripper; cultivation units, such as ORPs; auxiliary pumps; $NH_3$ and water make-up systems; heat exchangers; valves; and instrumentation and controls. Flue gas enters a WFGD for $SO_2$ removal. A fan is then used to boost the pressure before flowing downward through the membrane $CO_2$ absorber. Treated flue gas flows through a water-wash column to remove any $NH_3$ slip prior to stack emission. The $CO_2$-rich solution exited from the absorber will flow through a pump, a heater powered by solar energy, and a solvent regenerator followed by a rich-lean heat exchanger, be pressurized by a pump and recirculate through a lean solvent temperature polisher to $CO_2$ membrane absorber. The product stream at the solvent regenerator exhaust is injected to the cultivation unit via sparging under just-in-time supply control strategy. A 2 M ammonium solvent is used as a capture agent and N nutrient for algae growth. A membrane absorber with flow capacity of 15 cfm supplied by Compact Membrane System of Newport, Delaware is used for $CO_2$ capture and $NH_3$ slip study. A modularized cultivation unit with approximate 10 $m^2$ is used to evaluate the performance of system integration.

Absorber Performance Evaluation. Operation with 10 $ft^3$ $min^{-1}$ coal- and NG-derived and industrial flue gas is conducted to establish baseline performance of the membrane $CO_2$ absorber in terms of $CO_2$ capture and mass transfer enhancement, $NH_3$ slip and operation stability due to $NH_3$ salt formation. The solvent formulation may be adjusted by adding a chelating agent and the C5C catalyst to evaluate effect on mass transfer enhancement and $NH_3$ slip. The solvent regeneration heat input and operating parameters (temperature and pressure) is studied for $CO_2$:$NH_3$ regeneration ratio and solar heater specification. Rejection rate and flux change over time is also measured.

Algae Production Evaluation. UTEX B72 is cultured in a 1,200 L PBR and continuously fed with the appropriate $CO_2$:$NH_3$ ratio. The focus of this activity is on optimizing the $CO_2$:$NH_3$ introduction control system, based on pH. The algae culture ability to self-buffer, means that optimization is likely iterative. Algae productivity is determined based on regular gravimetric culture density measurements and the algae harvest. Culturing and harvesting follows standard practices. Measured productivity is compared with the modeled productivity for the same period/climatic conditions, using the UK CAER model.

Membrane Modeling. A module-scale model for a counter-current flow membrane absorber using a gas-permeation membrane with selective transport of $CO_2$ over $NH_3$ is used. Model inputs include the flue gas stream $CO_2$ partial pressure, influent concentration of $NH_4^+$ in $CO_2$-lean aqueous stripping stream, and conditions (P, T and flow) of both streams. System parameters include the experimentally measured permeabilities for $CO_2$ and $NH_3$ and membrane area. The model outputs the spatial distributions of the $CO_2$ partial pressure in flue gas stream, the $NH_4HCO_3$ concentration in the stripping stream, and the trans-membrane fluxes of $CO_2$ and $NH_3$ along the membrane module. This facilitates system optimization by balancing the membrane area and the solvent flowrate that strongly influences regeneration energy.

Example 2

Cultivation of Scenedesmus acutus Using Ammonium Ions as the Nitrogen Source

Experiments were conducted to assess the feasibility of culturing Scenedesmus acutus using ammonium ions as the nitrogen source. Aqueous ammonia could be an interesting option for scrubbing $CO_2$ from flue gas (as ammonium carbonate/bicarbonate), the resulting carbon- and nitrogen-rich stream being used for the cultivation of algae. Indeed, ammonia is a lower-cost source of N than other commonly used sources such as sodium nitrate and urea. However, while some organisms appear able to use aqueous ammonia as a N-source, for other organisms high concentrations of ammonium ions appear to be toxic.

Figure 13:
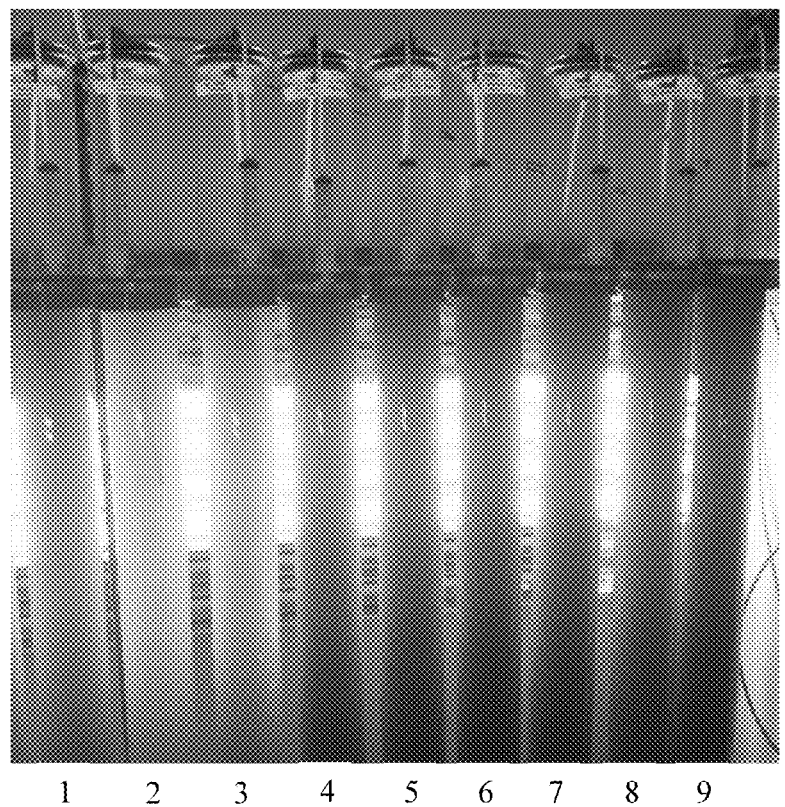
FIG. 13 is an image of a tubular PBR system in which *Scenedesmus acutus* was cultivated using urea (control), ammonium carbonate (($NH_4)_2CO_3$), and ammonium bicarbonate ($NH_4HCO_3$). Left to right: urea (n=3, tubes 1-3), ammonium carbonate (n=3, tubes 3-6), and ammonium bicarbonate (n=3, tubes 7-9).

Cultivation of Scenedesmus acutus was conducted using $(NH_4)_2CO_3$ (ammonium carbonate) (FIG. 13, tubes 4-6) and $NH_4HCO_3$ (ammonium bicarbonate) (FIG. 13, tubes 7-9) as the N-sources, as a surrogate for $CO_2$-enriched aqueous ammonia. In parallel, an experiment was performed using urea as a control (FIG. 13, tubes 1-3). The amounts of the N-containing compounds were adjusted to give the same molar concentration of nitrogen in all cases (urea=140 mg $L^{-1}$, $(NH_4)_2CO_3$=256 mg $L^{-1}$, $NH_4HCO_3$=422 mg $L^{-1}$) while the concentrations of the other nutrients were fixed according to the recipe of the urea-containing medium.[26]

Experiments were conducted in a temperature controlled (20-27° C.) 10 L tubular photobioreactor system (FIG. 13). An artificial light system set to a 16:8 light/dark cycle (T5 cool white fluorescent bulbs) delivered 500 micromole $m^{-2}$ $s^{-1}$ PAR of photoactive radiation. $CO_2$ was delivered as 3% $CO_2$/nitrogen balance from gas cylinders. The experiments ran for 21 days.

Figure 14:
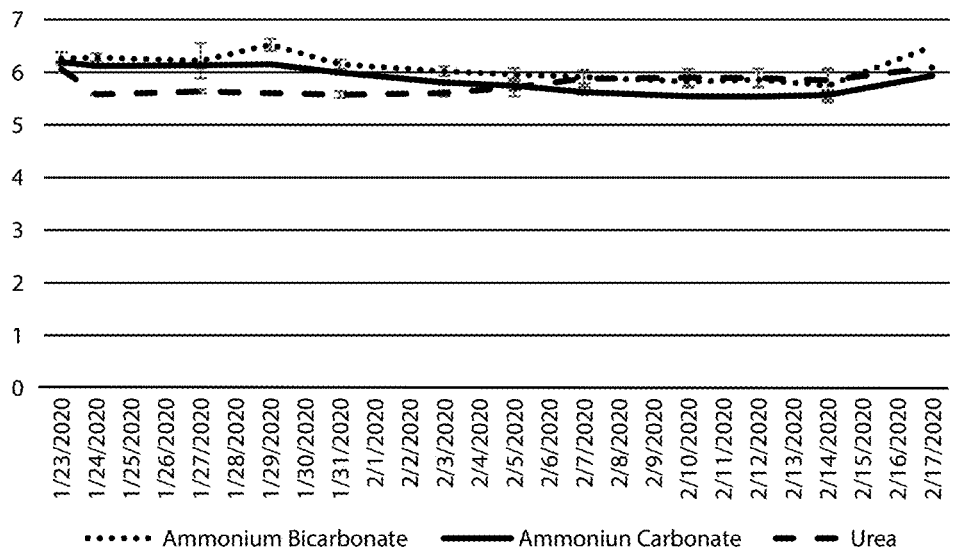
FIG. 14 is a graph showing ammonium ions as a nitrogen source: culture pH versus time. Error bars represent the standard deviation (n=3).

Three times a week pH, UV-vis absorbance and dry mass measurements were made. As shown in FIG. 14, the pH of all media were very similar and remained close to the initial culture pH of 6.3.

Figure 15:
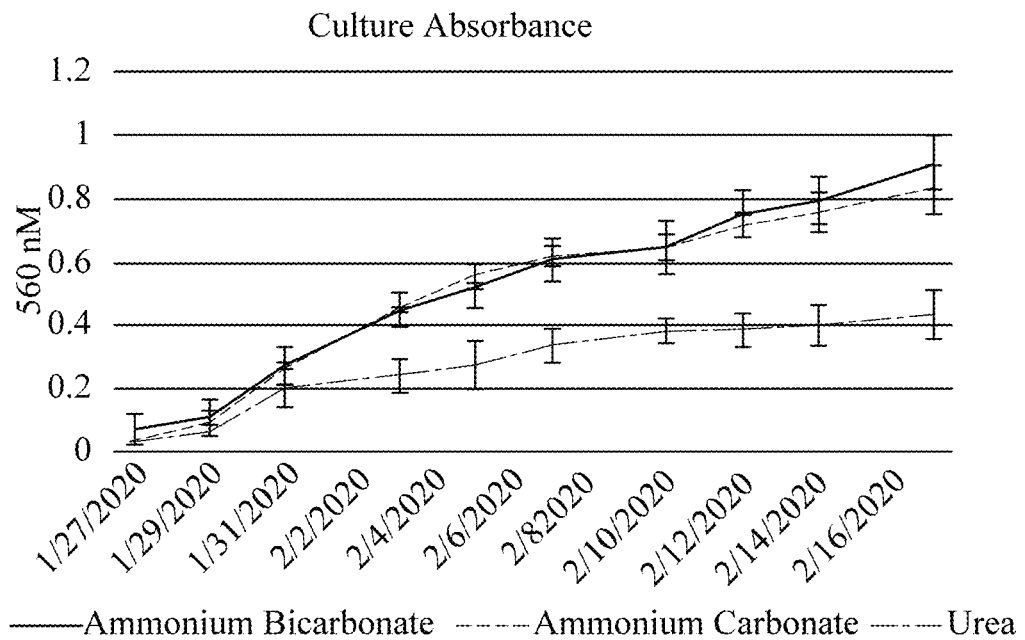
FIG. 15 is a graph showing ammonium ions as a nitrogen source: culture absorbance at 560 nm versus time. Error bars represent the standard deviation (n=3).
Figure 16:
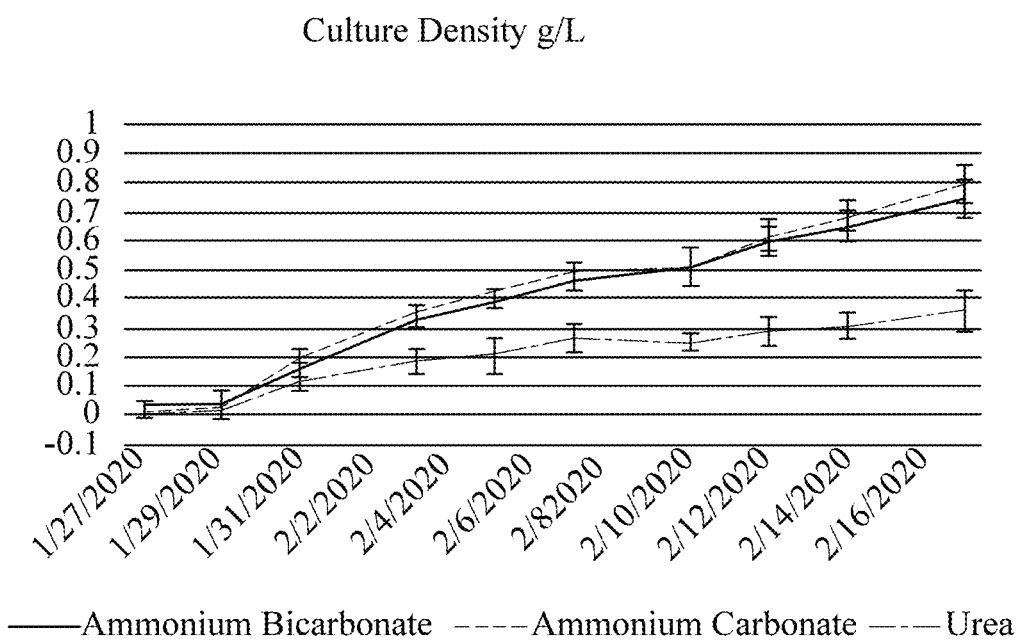
FIG. 16 is a graph showing ammonium ions as a nitrogen source: culture density in g/L (dry mass measurements) versus time. Error bars represent the standard deviation (n=3).

FIG. 15 depicts the measured UV-vis absorbance of the samples measured at 560 nm as a function of run time. These results clearly indicate that the cultures provided with $(NH_4)_2CO_3$ and $NH_4HCO_3$ were significantly more productive than the control. This result is confirmed by the corresponding dry mass measurements (FIG. 16): algae growth rates were significantly higher than for the control, there being no statistically significant difference between the rates for $(NH_4)_2CO_3$ and $NH_4HCO_3$. Evidently, the organism is able to utilize ammonium ions as a nutrient more efficiently than urea.

Overall, the above results confirm the suitability of ammonium ions as a N-source for Scenedesmus acutus and lend support to the viability of a process scheme in which $CO_2$ is scrubbed from flue gas using aqueous ammonia, the resulting C- and N-rich stream functioning as a nutrient stream for algae production.

Example 3

Indirect, Gas-Liquid Membrane $CO_2$ Absorber Performance Lab-Scale Hollow Fiber Indirect, Gas-Liquid Membrane A lab-scale $CO_2$ capture unit (FIG. 17) employing a hollow fiber membrane 314 (FIGS. 17 and 18A) as the membrane $CO_2$ absorber was provided with a downflow of water saturated feed gas to mimic flue gas inflow for testing periods ranging from 50 hrs (FIGS. 19B and 19C) to 100 hrs (FIG. 19A) to assess viability of prolonged operation of the membrane $CO_2$ absorber in conditions in which ammonium salt buildup on the gas-side of the membrane $CO_2$ absorber was possible. The hollow fiber membrane 314 included a non-porous CMS polymer 316 with fluoride material (FIG. 18B) and a microporous hollow fiber support with polyether ether ketone (PEEK) 318 (FIG. 18B) and was 8 inches in length with a surface area of 0.015 ft² (FIG. 18A). The hollow fiber membrane also exhibited a $N_2$ flow rate of 0.013 at 20 psig/cfm. Batches of ammonium solvent, both with (1M $NH_4OH$+0.5 M $(NH_4)_2CO_3$+1 wt % TGDE, 1M $NH_4OH$+0.5 M $(NH_4)_2CO_3$+20 wt % TGDE) and without chelating agents (1M $NH_4OH$+0.5 M $(NH_4)_2CO_3$), were utilized within the hollow fiber membrane. Total alkalinity/(mol/kg) and carbon loading/(mol/kg) for the different batches was assessed using acid titration and total organic carbon method, respectively.

Figure 19A:
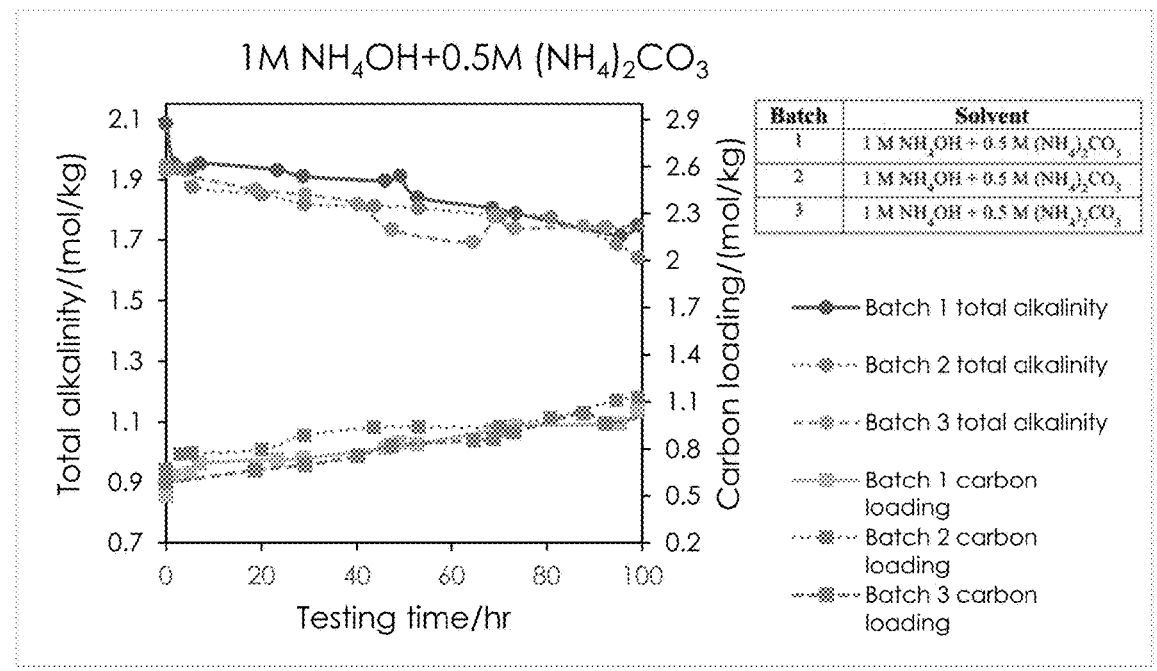
FIG. 19A is a chart showing the total alkalinity and carbon loading of three batches of 1M $NH_4OH$+0.5M $(NH_4)_2CO_3$ solvent utilized in the membrane $CO_2$ absorber of FIG. 18A in the lab-scale $CO_2$ capture unit of FIG. 17.
Figure 19B:
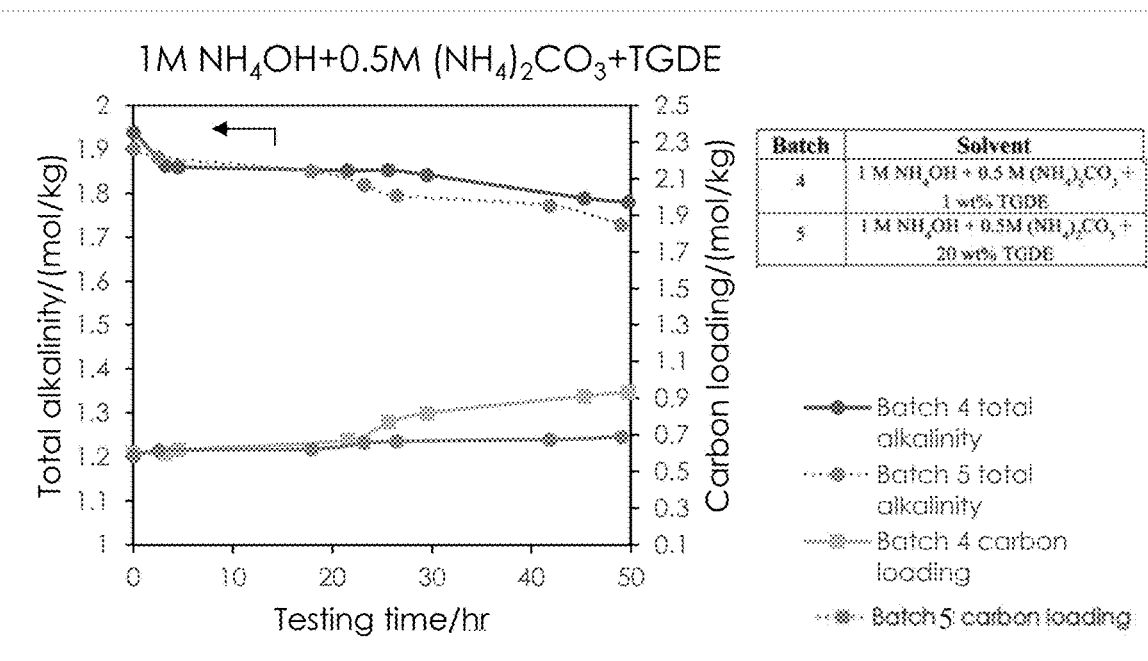
FIG. 19B is a chart showing the total alkalinity and carbon loading of 1M $NH_4OH$+0.5M $(NH_4)_2CO_3$+1 wt % TGDE solvent and 0.5M $(NH_4)_2CO_3$+20 wt % TGDE utilized in the membrane $CO_2$ absorber of FIG. 18A in the lab-scale $CO_2$ capture unit of FIG. 17.
Figure 19C:
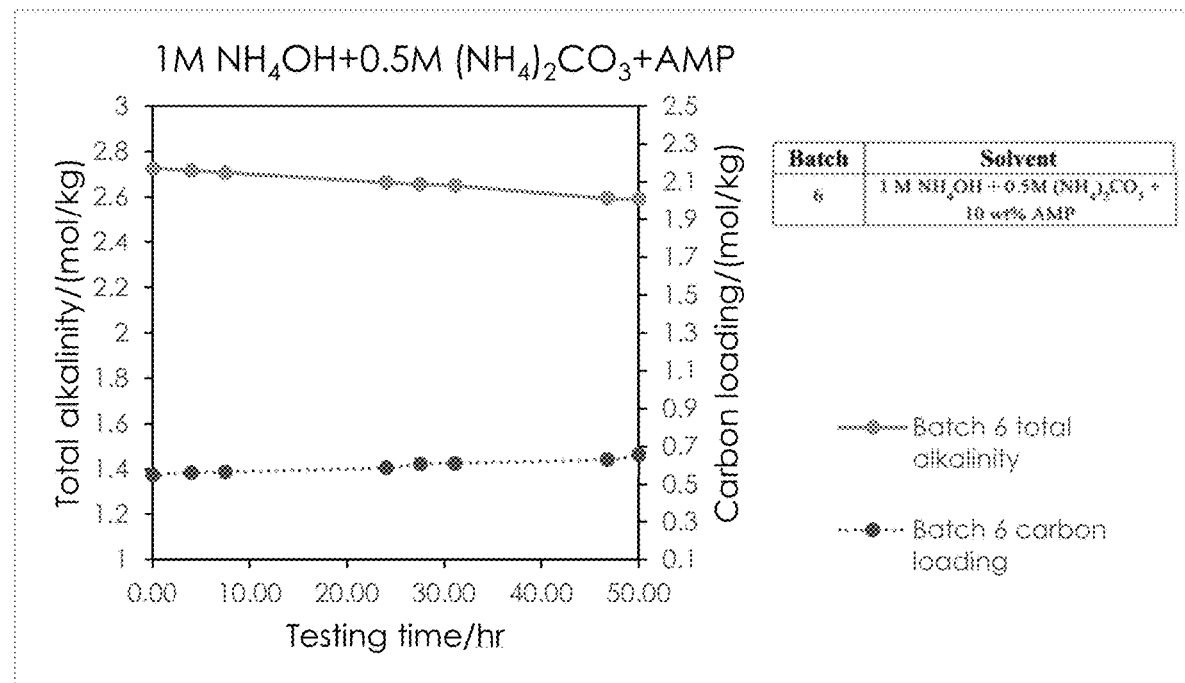
FIG. 19C is a chart showing the total alkalinity and carbon loading of three batches of 1M $NH_4OH$+0.5M $(NH_4)_2CO_3$+10 wt % AMP solvent utilized in the membrane $CO_2$ absorber of FIG. 18A in the lab-scale $CO_2$ capture unit of FIG. 17.

The total alkalinity/(mol/kg) and carbon loading/(mol/kg) of the solvent batches without chelating agent are shown in FIG. 19A. The total alkalinity/(mol/kg) and carbon loading/(mol/kg) of the solvent batches TGDE chelating agent are shown in FIG. 19B. The total alkalinity/(mol/kg) and carbon loading/(mol/kg) of the solvent batches with AMP chelating agent is shown in FIG. 19C. Ammonia slip of the tested batches is indicated in Table 3 below.

TABLE 3

Ammonia slip in ammonium solvent batches with and without chelating agent.

| Batch | Solvent | Testing time (hr) | Ammonia slip (ppm) |
|---|---|---|---|
| 1 | 1M $NH_4OH$ + 0.5M $(NH_4)_2CO_3$ | 100 | 6345 |
| 2 | 1M $NH_4OH$ + 0.5M $(NH_4)_2CO_3$ | 100 | 5409 |
| 3 | 1M $NH_4OH$ + 0.5M $(NH_4)_2CO_3$ | 100 | 5795 |
| 4 | 1M $NH_4OH$ + 0.5M $(NH_4)_2CO_3$ + 1 wt % TGDE | 50 | 5953 |
| 5 | 1M $NH_4OH$ + 0.5M $(NH_4)_2CO_3$ + 20 wt % TGDE | 50 | 5049 |
| 6 | 1M $NH_4OH$ + 0.5M $(NH_4)_2CO_3$ + 10 wt % AMP | 50 | 4826 |

The findings of the tests demonstrated that prolonged operation of an indirect gas-liquid membrane for flue gas $CO_2$ capture is possible as a result of any ammonium salts formed on the gas side of the membrane being washed by flue gas condensate. The findings also indicate that ammonia slip of ammonium solvent from the liquid side to the gas-side of the membrane can be reduced significantly with the use of chelating agents, in some cases up to 20%.

Bench-Scale Hollow Fiber Indirect, Gas-Liquid Membrane

The $CO_2$ capture unit of FIG. 2 was modified as to include a four-inch indirect, gas-liquid hollow membrane (FIG. 20) (i.e., in place of the flat sheet membrane shown in FIG. 3). The membrane (FIG. 20) was 20 inches in length with a surface area of 14 ft$^2$ and exhibited an $N_2$ flow rate of 1.907 at 20 psig/cfm. Multiple ammonium solvents, both with and without various chelating agents, were utilized within the membrane to facilitate $CO_2$ capture. With each solvent, the membrane was provided with a downflow of saturated flue gas for a period of 50 hours and tested for $CO_2$ capture efficiency and gas pressure drop over such period. $CO_2$ capture efficiency was tested via mass balance and gas pressured drop was measured by determining differential pressure. $NH_3$ slip and outlet $CO_2$% output percentage were also measured with respect to the solvents of 2M $NH_4OH$ and 2M $NH_4OH$+8.9 wt % Tris at different carbon loading C/N ratios.

Figure 20:
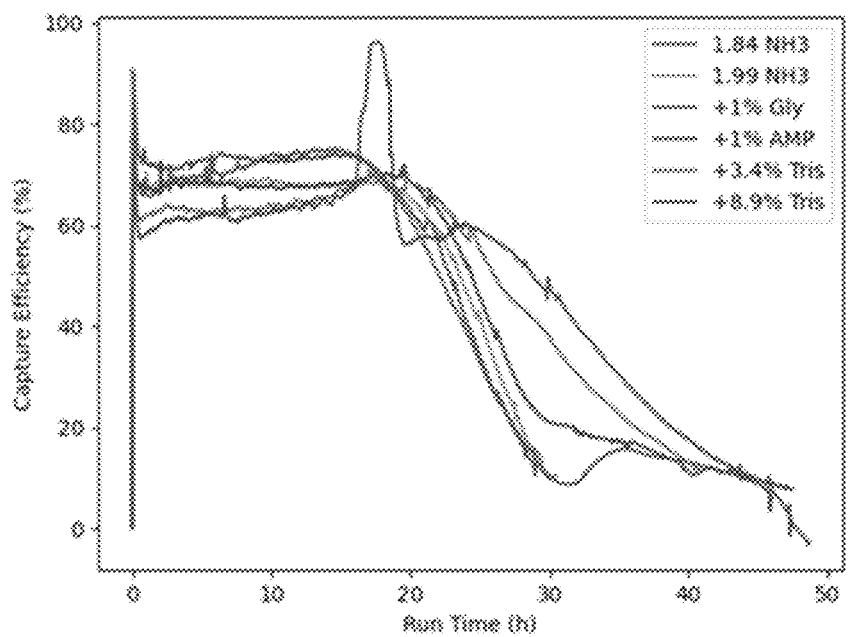
FIG. 20 is a graph showing the $CO_2$ capture efficiency of the first alternative membrane $CO_2$ of FIG. 4 over a 50 hour period when implemented in the $CO_2$ capture unit of FIG. 2 and tested using multiple ammonium solvents, including solvents with and without chelating agents.
Figure 21:
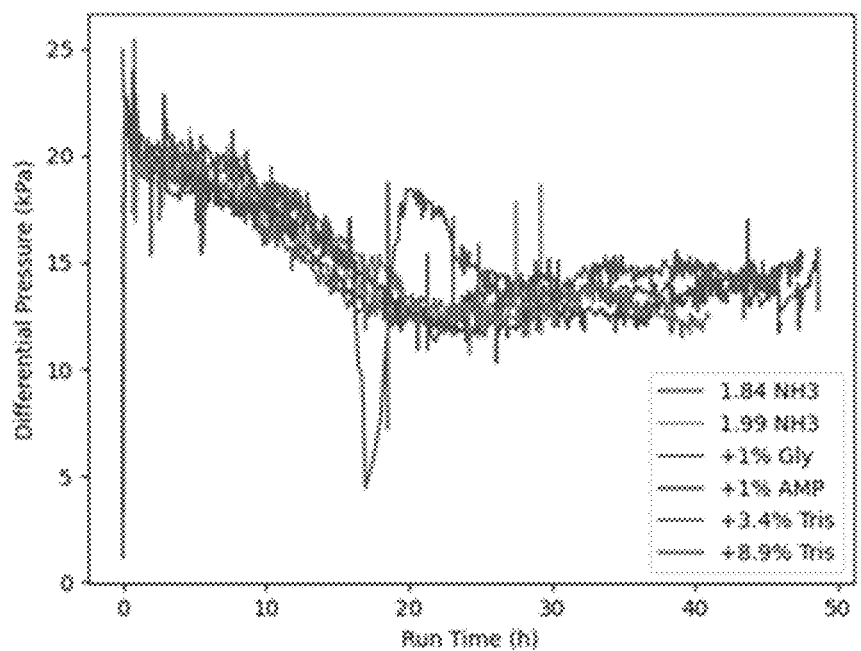
FIG. 21 is a graph showing the gas pressure drop of the tested ammonium solvents of FIG. 20 over a 50 hour operation period.

The $CO_2$ capture efficiency using the tested ammonium solvents over the 50 hour operation period are shown in FIG. 20. The gas pressure drop of the tested ammonium solvents over the 50 hour operation period are shown in FIG. 21. Ammonia slip of, and % $CO_2$ exhausted following interaction with of 2M $NH_4OH$ and 2M $NH_4OH$+8.9 wt % Tris is indicated in Table 4 below.

TABLE 4

| Solvent | Total alkalinity (mol/kg) | Carbon loading (mol/kg) | Carbon loading (mol C/mol N) | Outlet $CO_2$ (%) | $NH_3$ slip (ppm) |
|---|---|---|---|---|---|
| 2M $NH_4OH$ | 1.718-1.706 | 1.26-1.36 | 0.733-0.797 | 6.77-8.39 | 1001 |
| 2M $NH_4OH$ + 8.9 wt % Tris | 2.295-2.281 | 1.36-1.39 | 0.592-0.609 | 6.94-7.76 | 1050 |

The findings of the tests indicated that with the hollow fiber membrane of FIG. 20, 1000 ppm $NH_3$ slip can be achieved at a carbon loading of 0.6 C/N (higher free amine concentration) with the addition of Tris instead of 0.8 C/N (lower free amine concentration) in 2M $NH_4OH$.

Flat Sheet Indirect, Gas-Liquid Membrane

The $CO_2$ capture unit of FIG. 2, including the flat-sheet membrane of FIG. 3 with Sterlitech® PTFE membrane, was tested for $CO_2$ capture efficiency when provided with various ammonium solvents, both with (2M $NH_4OH$+10 wt % AMP and 2M $NH_4OH$+10 wt % Tris) and without (2M $NH_4OH$) various chelating agents, and supplied with saturated flue gas for periods ranging from 8 hrs to 16 hrs. $NH_3$ slip, carbon loading mol C/mol N, and total alkalinity were also measured with respect to each solvent at different carbon loading C/N. $CO_2$ capture efficiency was measured by mass balance. $NH_3$ slip was measured via sampling the flue gas post interaction with the respective solvents. Carbon loading was measured via total organic carbon method. Total alkalinity was measured via acid titration.

Figure 22:
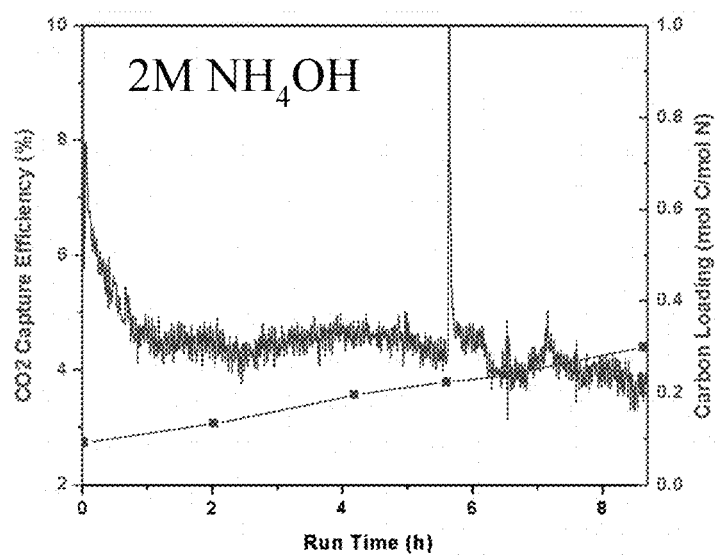
FIG. 22 is a graph showing the $CO_2$ capture efficiency and carbon loading (mol C/mol N) of the membrane $CO_2$ absorber of FIGS. 2 and 3 when tested with 2M $NH_4OH$ solvent.
Figure 23:
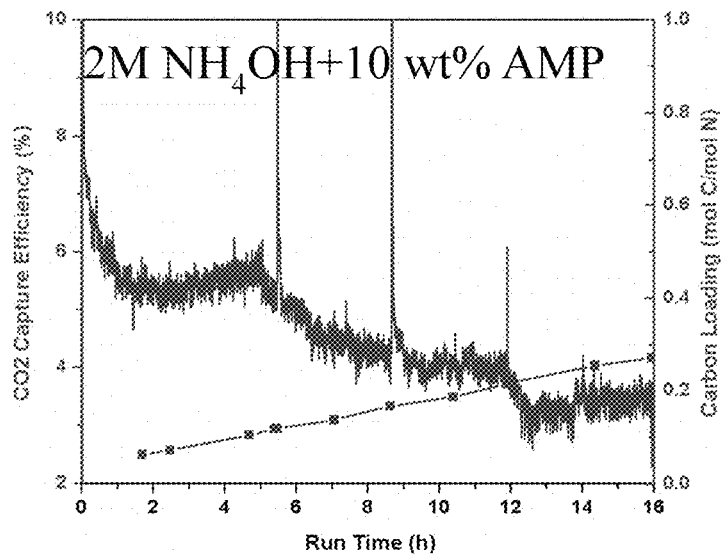
FIG. 23 is a graph showing the $CO_2$ capture efficiency and carbon loading (mol C/mol N) of the membrane $CO_2$ absorber of FIGS. 2 and 3 when tested with 2M $NH_4OH$+10 wt % AMP solvent.
Figure 24:
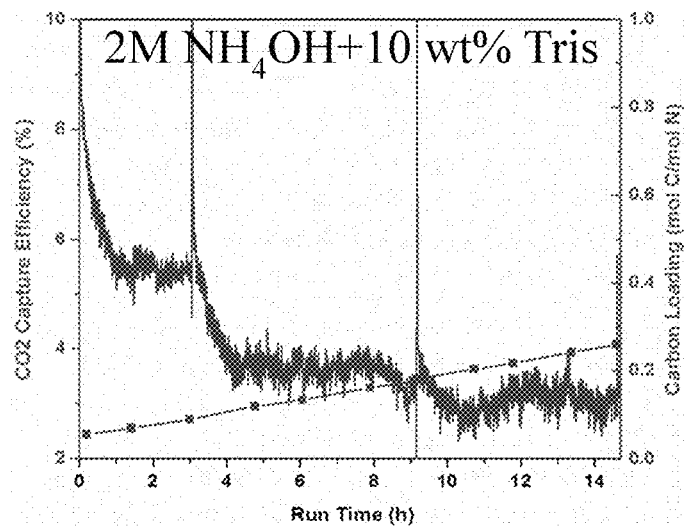
FIG. 24 is a graph showing the $CO_2$ capture efficiency and carbon loading (mol C/mol N) of the membrane $CO_2$ absorber of FIGS. 2 and 3 when tested with 2M $NH_4OH$+10 wt % Tris solvent.

The $CO_2$ capture efficiency and carbon loading with the 2M $NH_4OH$ solvent is shown in FIG. 22 and Table 5 below. The total alkalinity and $NH_3$ slip with the 2M $NH_4OH$ solvent is shown in Table 5 below. The $CO_2$ capture efficiency and carbon loading with the 2M $NH_4OH$+10 wt % AMP solvent is shown in FIG. 23 and Table 5 below. The total alkalinity and $NH_3$ slip with the 2M $NH_4OH$+10 wt % AMP solvent is shown in Table 5 below. The $CO_2$ capture efficiency and carbon loading with the 2M $NH_4OH$+10 wt % Tris solvent is shown in FIG. 24 and Table 5 below. The total alkalinity and $NH_3$ slip with the 2M $NH_4OH$+10 wt % Tris solvent is shown in Table 5 below. In FIGS. 23-24 the trend line with square markers corresponds to carbon loading (mol C/mol N).

TABLE 5

| Solvent | Total alkalinity (mol/kg) | Carbon loading (mol/kg) | Carbon loading (mol C/mol N) | Outlet $CO_2$ (%) | $NH_3$ slip (ppm) |
|---|---|---|---|---|---|
| 2M $NH_4OH$ | 1.273-1.115 | 0.30-0.35 | 0.238-0.299 | 4.79-4.81 | 1925 |
| 2M $NH_4OH$ + 10 wt % AMP | 1.892-1.832 | 0.48-0.50 | 0.254-0.270 | 4.77-4.79 | 1559 |
| 2M $NH_4OH$ + 10 wt % Tris | 1.598-1.568 | 0.39-0.41 | 0.242-0.260 | 4.79-4.83 | 1364 |

The findings of the tests indicated that, with the flat sheet membrane (FIG. 3), 1000 ppm $NH_3$ slip can be demonstrated at ~0.25 C/N with the addition of 10 wt % Tris. During the course of testing the flat sheet membrane (FIG. 3) it was also observed that the flat sheet membrane achieved a 0.7 kPa pressure drop on the gas side between the membrane inlet and outlet for the flat sheet membrane at 5 cfm feed flow rate as compared to a 15 kPa pressure drop for the hollow fiber membrane of FIG. 20 at 0.2 cfm.

MICRODYN Hollow Fiber Indirect, Gas-Liquid Membrane

Figure 25:
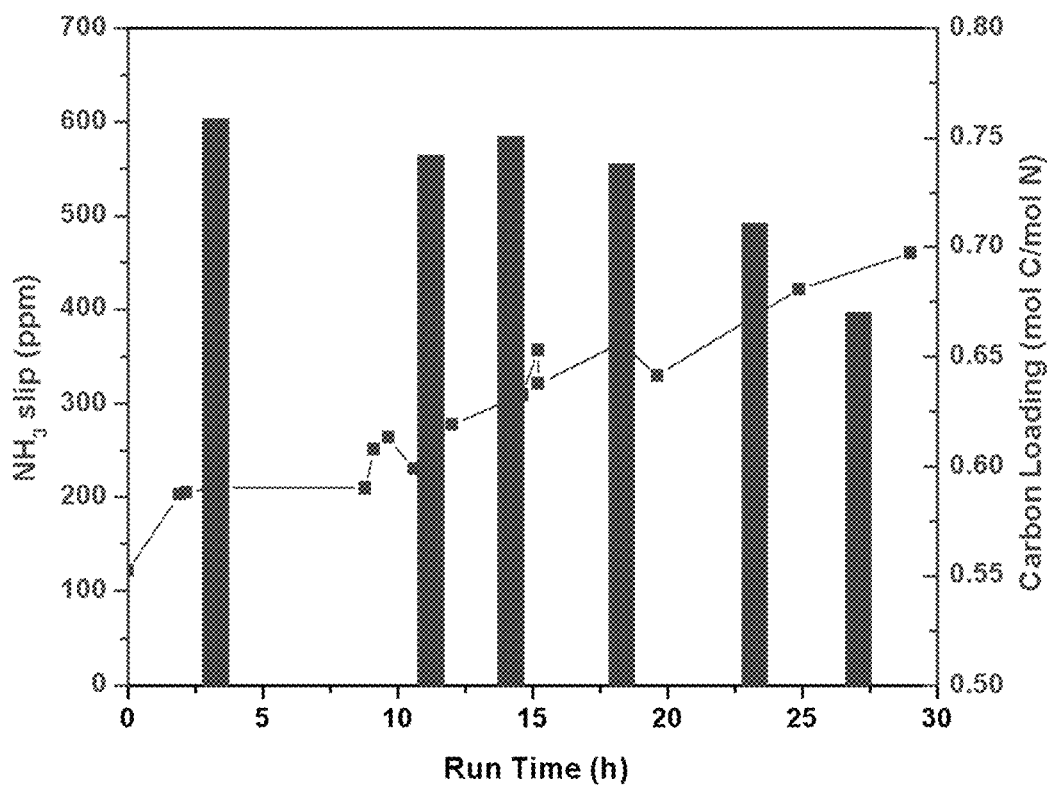
FIG. 25 is a graph showing the $NH_3$ slip (bars) and carbon loading (mol C/mol N) (trend line with square makers) of the second alternative membrane absorber of FIG. 5 when implemented in the $CO_2$ capture unit of FIG. 2 and tested using $NH_4OH$ solvent.

The $CO_2$ capture unit of FIG. 2 was modified as to include and utilize a MICRODYN hollow fiber membrane (FIG. 5) with a membrane diameter of 1.8 mm, a membrane area of 0.75 m$^2$, and a free flow area of 5 cm$^2$ (i.e., instead of using the flat sheet membrane shown in FIG. 3). $NH_3$ slip at different carbon loading (mol C/mol N) ratios was first measured for the MICRODYN membrane (FIG. 5) provided with 2M $NH_4OH$ and supplied with saturated flue gas for a period of approximately 27 hrs, the results of which are evidenced in FIG. 25 and Table 6 below.

TABLE 6

| Carbon loading (mol C/mol N) | NH$_3$ slip (ppm) |
| --- | --- |
| 0.588-0.591 | 603 |
| 0.599-0.619 | 565 |
| 0.638-0.656 | 585 |
| 0.656-0.681 | 492 |
| 0.681-0.697 | 397 |

Figure 26:
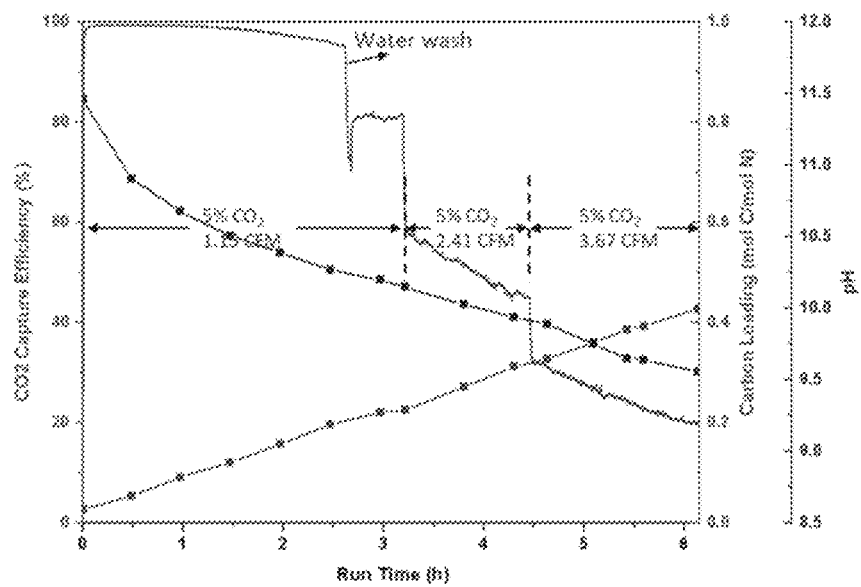
FIG. 26 is a graph showing the $CO_2$ capture efficiency, carbon loading (mol C/mol N), and pH of the second alternative membrane absorber of FIG. 5 when implemented in the $CO_2$ capture unit of FIG. 2 and tested using $NH_4OH$ solvent, with the $CO_2$ concentration is set of 5% and gas feed inflow is adjusted to 0.15 CFM, 2.41 CFM, and 3.67 CFM.
Figure 27:
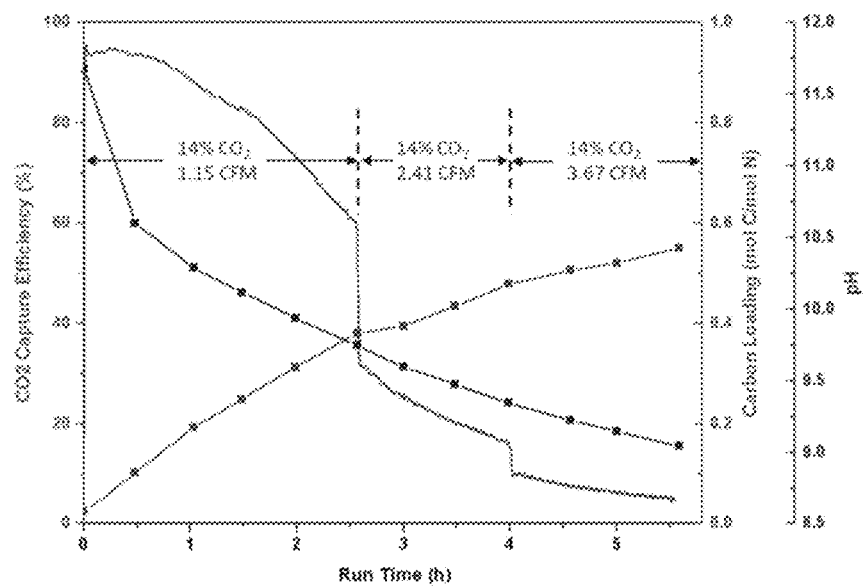
FIG. 27 is a graph showing the $CO_2$ capture efficiency, carbon loading (mol C/mol N), and pH of the of the second alternative membrane absorber of FIG. 5 when implemented in the $CO_2$ capture unit of FIG. 2 and tested using $NH_4OH$ solvent, with the $CO_2$ concentration is set of 14% and gas feed inflow is adjusted to 0.15 CFM, 2.41 CFM, and 3.67 CFM.

The effect of gas feed flow rate with respect to $CO_2$ Efficiency and pH at different carbon loading (mol C/mol N) levels using the MICRODYN membrane was also tested by (i) setting the inlet $CO_2$ concentration to 5% and adjusting the gas feed flow to 1.15 CFM, 2.41 CFM, and 3.67 CFM (FIG. 26) and (ii) setting $CO_2$ concentration to 14% and adjusting the gas feed flow to 1.15 CFM, 2.41 CFM, and 3.67 CFM (FIG. 27). In both instances, the liquid inlet pressure was 1 psig and the gas inlet pressure was ~0.5 psig.

Testing of the MICRODYN membrane revealed that the increased inner diameter of the membrane dramatically decreased pressure drop and that residence time is the main impact on $CO_2$ capture efficiency.

Advanced Membrane Development

Figure 17:
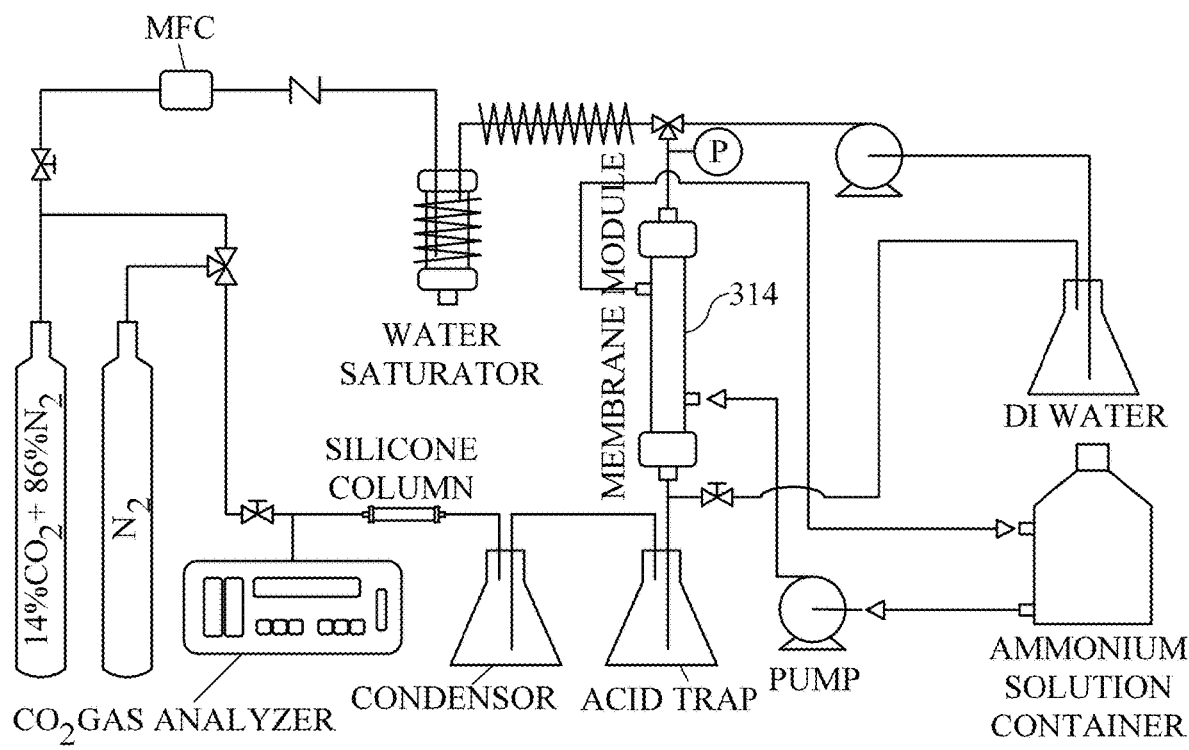
FIG. 17 is an annotated image of a lab-scale $CO_2$ capture unit.
Figure 18A:
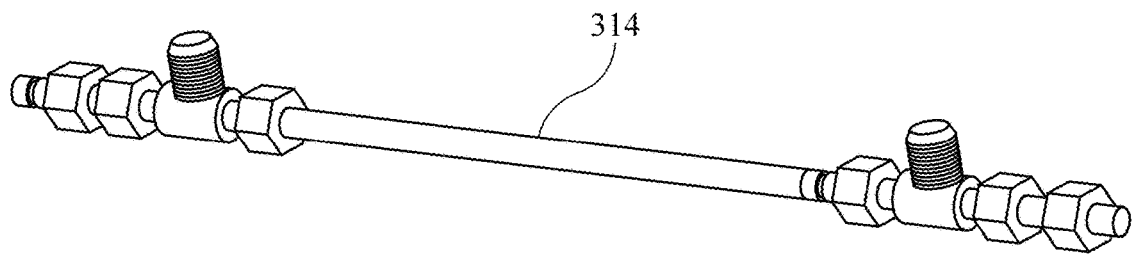
FIG. 18A is an image of a membrane $CO_2$ absorber which can be utilized in the lab-scale $CO_2$ capture unit of FIG. 17.
Figure 18B:
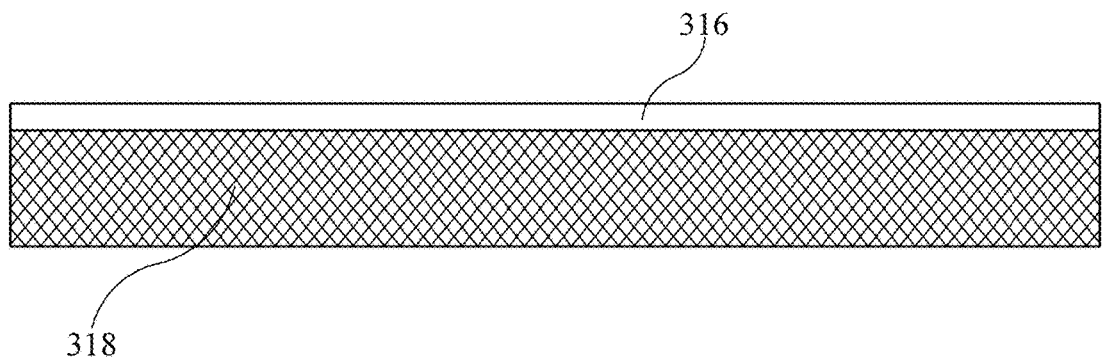
FIG. 18B is a sectional view of the membrane $CO_2$ absorber of FIG. 18A.
Figure 28:
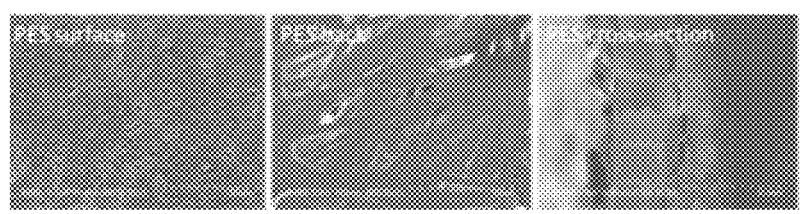
FIG. 28 is a set of three images showing a front surface, back surface, and cross sectional view of a polyethersulfone (PES) substrate.
Figure 29:
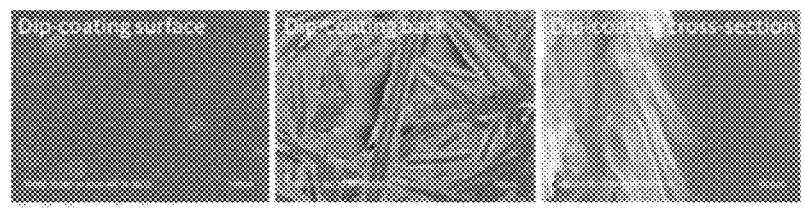
FIG. 29 is a set of three images showing a front surface, back surface, and cross sectional view of a PES substrate coated with 0.1 wt % Teflon AF2400 by virtue of being dipped into Teflon AF2400 for a period of 1 minute.
Figure 30:
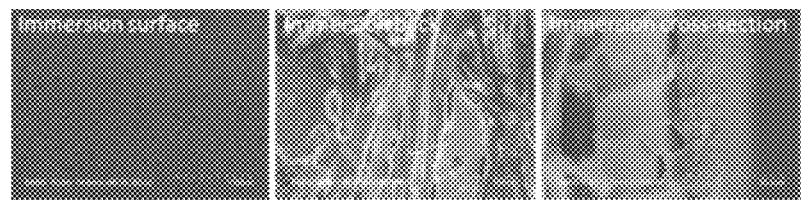
FIG. 30 is a set of three images showing a front surface, back surface, and cross sectional view of a PES substrate coated with 1 wt % Teflon AF2400 by virtue of being immersed into Teflon AF2400 for a period of 10 minute.
Figure 31:
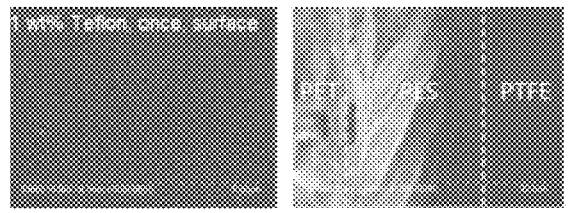
FIG. 31 is a pair of two images showing a surface and cross-sectional view of a Sterlitech® PTFE 0.1 µm laminated membrane.
Figure 32:
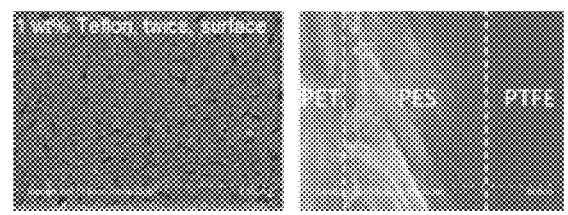
FIG. 32 is a pair of two images showing a surface and cross-sectional view of a Sterlitech® PTFE 0.2 µm laminated membrane.

To determine which membrane compositions best serve to reduce $NH_3$ slip, various membranes were tested using the lab-scale $CO_2$ capture unit of FIG. 17. Specifically the following membranes were tested: a polyethersulfone (PES) substrate (FIG. 28); a PES substrate coated with 0.1 wt % Teflon AF2400 by virtue of being dipped into Teflon AF2400 for a period of 1 minute (FIG. 29); a PES substrate coated with 1 wt % Teflon AF2400 by virtue of being immersed into Teflon AF2400 for a period of 10 minutes (FIG. 30); a Sterlitech® PTFE 0.1 µm laminated membrane (FIG. 31); and a Sterlitech® PTFE 0.2 µm laminated membrane (FIG. 32). All membranes were tested with 1M $NH_4OH$+0.5 M $(NH_4)_2CO_3$ to simulate solvent circulated back from the utilization unit (i.e., lean solvent provided with concentrated $NH_4OH$). The $NH_3$ slip observed for each of the tested membranes is shown in Table 7 below.

TABLE 7

| Membrane | Contact Angle (°) | Solvent | Run time (h) | Ammonia Slip (ppm) |
| --- | --- | --- | --- | --- |
| PES substrate | 81 | 1M NH$_4$OH + 0.5M (NH$_4$)$_2$CO$_3$ | 3 | 559 |
| PES coated with 0.1 wt % Teflon AF2400 for 10 min | 118 | 1M NH$_4$OH + 0.5M (NH$_4$)$_2$CO$_3$ | 3 | 65 |
| PES coated with 1 wt % Teflon AF2400 for 1 min | 125 | 1M NH$_4$OH + 0.5M (NH$_4$)$_2$CO$_3$ | 6 | 40 |
| Sterlitech PTFE 0.1 µm laminated | 134 | 1M NH$_4$OH + 0.5M (NH$_4$)$_2$CO$_3$ | 5 | 80 |
| Sterlitech PTFE 0.2 µm laminated | 130 | 1M NH$_4$OH + 0.5M (NH$_4$)$_2$CO$_3$ | 6 | 734 |

Example 4

Algae Production

Figure 33:
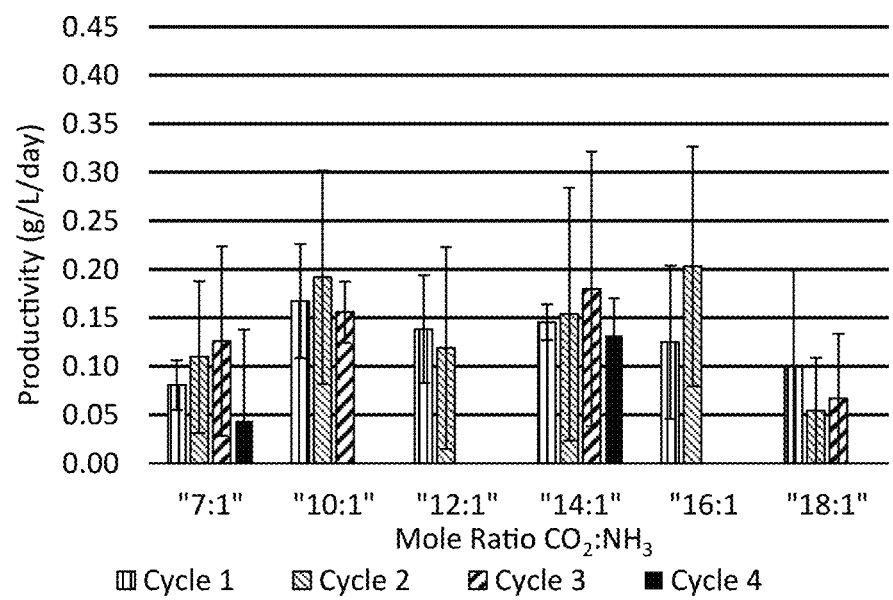
FIG. 33 is a chart showing the productivity (g/L/day) of algae provided with varying mole ratios of $CO_2$:$NH_3$ across different cycles.

To Examine the effect $CO_2$:$NH_3$ mole ratios on *Scenedesmus acutus* culture health and productivity, experiments were conducted in 800 mL bioreactors with constant gas sparging and different $CO_2$:$NH_3$ mole ratios (ranging from 7:1 up to 18:1) (FIG. 33). The "cycles" indicated in FIG. 33 refer to growth cycles of algae. In this regard, each bioreactor is normally inoculated with algae at a low concentration (e.g., 0.1 g/LO and the algae are allowed to grow until a concentration of 1 g/L is obtained. At this point, the algae are harvested until a concentration of 0.1 g/L is left in the bioreactor (with the addition of fresh nutrients and water). The algae are allowed to grow again until a concentration of 1 g/L is again reached, followed by harvesting. Each period of growth up to harvesting is characterized as a growth cycle.

As shown in FIG. 33, test revealed that the optimal $CO_2$:$NH_3$ mole ratio lines in the range of 10:1-16:1. As shown in Table 8 below, the growth rate of 10:1 $CO_2$:$NH_3$ ratio is higher than that obtained using traditional nitrogen sources, such as $NaNO_3$. For 10:1 $CO_2$:$NH_3$, $NH_3$ utilization was found to be approximately 100% and $CO_2$ utilization was found to be approximately 70%.

TABLE 8

| Urea | NaNO$_3$ | CO$_2$/NH$_3$ (10:1) |
| --- | --- | --- |
| 0.11 ± 0.04 | 0.13 ± 0.05 | 0.17 ± 0.05 |

One of ordinary skill in the art will recognize that additional embodiments and implementations are also possible without departing from the teachings of the present invention. This detailed description, and particularly the specific details of the exemplary embodiments and implementations disclosed herein, is given primarily for clarity of understanding, and no unnecessary limitations are to be understood therefrom, for modifications will become obvious to those skilled in the art upon reading this disclosure and may be made without departing from the spirit or scope of the invention.

All publications, patents, and patent applications mentioned in this specification are herein incorporated by reference to the same extent as if each individual publication, patent, or patent application was specifically and individually indicated to be incorporated by reference, including the references set forth in the following references list:

REFERENCES

1. Diao, N., Q. Li, and Z. Fang. 2004. Heat transfer in ground heat exchangers with groundwater advection. *International Journal of Thermal Sciences.* 43: 1203-1211, https://doi.org/10.1016/j.ijthermalsci.2004.04.009.

2. He, Q., M. Chen, L. Meng, K. Liu, and W. Pan. 2004. Study on Carbon Dioxide Removal from Flue Gas by Absorption of Aqueous Ammonia. Western Kentucky University. https://www.semanticscholar.org/paper/Study-on-Carbon-Dioxide-Removal-from-Flue-Gas-by-of-He-Chen/4994d1230f70482e0b2fa8abbecd9a1daedfd5e0.
3. Yeh, A. C., and H. Bai. 1999. Comparison of ammonia and monoethanolamine solvents to reduce $CO_2$ greenhouse gas emissions. *The Science of the Total Environment*. 228: 121-133, https://doi.org/10.1016/50048-9697(99)00025-X.
4. Villeneuve, K., D. Roizard, J. C. Remigy, M. Iacono, and S. Rode. 2018. $CO_2$ capture by aqueous ammonia with hollow fiber membrane contactors: Gas phase reactions and performance stability. *Separation and Purification Technology*, 199: 189-197, https://doi.org/10.1016/j.seppur.2018.01.052.
5. Toro Molina, C., and C. Bouallou. 2016. Carbon dioxide absorption by ammonia intensified with membrane contactors. *Clean Techn Environ Policy* 18, 2133-2146 (2016), https://doi.org/10.1007/s10098-016-1140-0.
6. Makhloufi, C., E. Lasseuguette, J. C. Remigy, B. Belaissaoui, D. Roizard, and E. Favre. 2014. Ammonia based $CO_2$ capture process using hollow fiber membrane contactors. *Journal of Membrane, Science*, 455. 236-246, https://doi.org/10.1016/j.memsci.2013.12.063.
7. Berman, T., and S. Chava. 1999. Algal growth on organic compounds as nitrogen sources. *Israel Oceanographic*. 21: 1423-1437, https://doi.org/10.1093/plankt/21.8.1423.
8. Finlay, K., P. R. Leavitt, B. Wissel, and Y. T. Prairie. 2009. Regulation of spatial and temporal variability of carbon flux in six hard-water lakes of the northern Great Plains. *Limnol. Oceanogr.* 54: 2553-2564, https://doi.org/10.4319/10.2009.54.6_part_2.2553.
9. Sutter, D., M. Gazzani, and M. Mazzotti. 2015. Formation of solids in ammonia-based $CO_2$ capture processes—Identification of criticalities through thermodynamic analysis of the $CO_2$—NH3-H2O system. *Chemical Engineering Science*. Volume 133, 8 Sep. 2015, Pages 170-180, https://doi.org/10.1016/j.ces.2014.12.064.
10. Wilson, M. H., J. G. Groppo, T. Grubbs, S. Kesner, E. M. Frazar, A. Shea, C. Crofcheck, and M. Crocker. 2016. Capture and Recycle of Industrial $CO_2$ Emissions using Microalgae. *Appl. Petrochem. Res.*, 6: 279-293, https://doi.org/10.1007/s13203-016-0162-1.
11. McBride, R. C., et al. 2016. Crop protection in open ponds, in Microalgal Production for Biomass and High-Value Products, S. P. Slocombe and J. R. Benemann, Editors. *CRC Press*: Boca Raton, FL.
12. Beckstrom, B. D., M. H. Wilson, M. Crocker, and J. C. Quinn. 2020. Bioplastic production from microalgae with fuel co-products: A techno-economic and life-cycle assessment, *Algal Res.*, in press. 46: 101769, https://doi.org/10.1016/j.algal.2019.101769.
13. Somers, M. D; and Quinn, J. C; Sustainability of carbon delivery to an algal biorefinery: A techno-economic and life-cycle assessment, Journal of $CO_2$ Utilization 30 (2019) 193-204.
14. Cost and Performance Baseline for Fossil Energy Plants Volume 1: Bituminous Coal and Natural Gas to Electricity Revision 4, (NETL-PUB-22638), United States Department of Energy (DOE), National Energy Technology Laboratory (NETL), Pittsburgh, Pennsylvania, September 2019. https://netl.doe.gov/projects/files/CostAndPerformanceBaselineForFossilEnergyPlantsVol1BitumCoalAndNGtoElectBBRRev4-1_092419.pdf.
15. Crocker, M., J. Groppo, S. Kesner, D. Mohler, R. Pace, E. Santillan-Jimenez, M. Wilson, J. Schambach, J. Stewart, and A. Zeller. 2018. A Microalgae-Based Platform for the Beneficial Re-use of Carbon Dioxide Emissions from Power Plants, Final Technical Report, DOE-KENTUCKY-FE0026396, https://www.osti.gov/biblio/1419316/.
16. Mordor Intelligence. 2019. Bioplastics Market-Growth, Trends and Forecast (2020-2025). https://www.mordorintelligence.com/industry-reports/bioplastics-market.
17. European Bioplastics. 2019. Bioplastics market data. https://www.european-bioplastics.org/market/.
18. Laurens, L. M. L, M. Chen-Glasser, and J. D. McMillan. 2017. A perspective on renewable bioenergy from photosynthetic algae as feedstock for biofuels and bioproducts. *Algal Res*. 24A: 261-264, https://doi.org/10.1016/j.algal.2017.04.002.
19. Williams, P. J. B., and L. M. L. Laurens. 2010. Microalgae as biodiesel & biomass feedstocks: Review & analysis of the biochemistry, energetics & economics. *Energy Environ*. Sci., 3: 554-590, https://doi.org/10.1039/b924978h.
20. Crofcheck, C., X. E, A. Shea, M. Montross, M. Crocker, and R. Andrews. 2013. Influence of flue gas components on the growth rate of *Chlorella vulgaris* and *Scenedesmus acutus*. *Trans. ASABE*, 56(6): 1421, https://doi.org/10.13031/trans.56.10094.
21. Crofcheck, C., X. E, A. Shea, M. Montross, R. Andrews, and M. Crocker. 2012. Influence of media composition on the growth rate of *Chlorella vulgaris* and *Scenedesmus acutus* utilized for $CO_2$ mitigation. *J. Biochem. Technol.*, 42: 589-594, https://doi.org/10.13031/2013.41734.
22. Rhea, N. A., J. Groppo, and C. Crofcheck. 2017. Evaluation of Flocculation, Sedimentation and Filtration for Dewatering of *Scenedesmus* Algae. *Trans ASABE*, 60(4): 1359-1367, https://pdfs.semanticscholar.org/de93/69bd4a422ff9889231d82baeb8226dd8e920.pdf.
23. Wilson, M. H., A. Placido, S. Graham, S. A. Morton III, E. Jimenez-Santillan, A. Shea, M. Crocker, C. Crofcheck, and R. Andrews. 2014. $CO_2$ Recycling using Microalgae for the Production of Fuels. *Appl. Petrochem*. Res., 4: 41-53, https://doi.org/10.1007/s13203-014-0052-3.
24. Mohler, D. T., M. H. Wilson, Z. Fan, J. G. Groppo, and M. Crocker. 2019. Beneficial Reuse of Industrial $CO_2$ Emissions Using a Microalgae Photobioreactor: Waste Heat Utilization Assessment. *Energies*. 12(13), 2634, https://doi.org/10.3390/en12132634.
25. Melanson, D., and J. Wells. 2016. "UK CAER Algal Research Hitting the Ground in China." University of Kentucky. UKNow. https://uknow.uky.edu/research/centers-and-institutes/center-applied-energy-research-caer/uk-caer-algal-research-hitting.
26. Crofcheck, C.; E, X.; Shea, A.; Montross M.; Crocker, M.; Andrews, R. 2012. Influence of media composition on the growth rate of *Chlorella vulgaris* and *Scenedesmus acutus* utilized for $CO_2$ mitigation, J. Biochem. Technol., 4(2): 589-594.
27. Compact Membrane Systems. 2020. Membrane Materials & Technologies for Tough Chemical Separations. https://compactmembrane.com/.

What is claimed is:
1. A carbon dioxide (CO2) capture and utilization system, comprising:
a CO2 capture unit including a membrane CO2 absorber for receiving a flue gas, the membrane CO2 absorber including a first section in which the flue gas is received into the membrane CO2 absorber, a second section through which an ammonium solvent passes, and a membrane positioned between the first section and the second section, the membrane configured to prevent direct contact between the flue gas and ammonium solvent but permit the passage of CO2 within the flue gas from the first section to the second section, whereby the interaction between the ammonium solvent and the CO2 in the second section produce CO2-rich solvent; and a utilization unit in fluid communication with the CO2 capture unit and including a cultivation subsystem for cultivating one or more species of algae or cyanobacteria;

wherein, in use, the utilization unit processes the CO2-rich solvent to produce a product stream that is provided to the cultivation subsystem and includes CO2 and NH3 in a predetermined CO2:NH3 ratio of about 7:1 to about 16:1.

2. The $CO_2$ capture and utilization system of claim 1, wherein the ammonium solvent includes ammonium hydroxide ($NH_4OH$).

3. The $CO_2$ capture and utilization system of claim 1, wherein the ammonium solvent includes a chelating agent.

4. The $CO_2$ capture and utilization system of claim 3, wherein the chelating agent is one of triethylene glycol di-2-ethylhexoate (TGDE), amino trimethylene phosphonic acid (AMP), tris(hydroxymethyl)aminomethane (Tris), and $ZnCl_2$.

5. The $CO_2$ capture and utilization system of claim 3, wherein the chelating agent reduces $NH_3$ slip corresponding to $NH_3$ from the ammonium solvent traveling through the membrane to the first section of the membrane $CO_2$ absorber as compared to a control ammonium solvent without the chelating agent.

6. The $CO_2$ capture and utilization system of claim 1, and further comprising:

a conduit in fluid communication with a flue gas supply and the membrane $CO_2$ absorber, wherein the conduit and the membrane $CO_2$ absorber are oriented relative to each other, such that, when the flue gas from the flue gas supply is saturated, the conduit delivers the saturated flue gas in a downflow that washes the membrane of the membrane $CO_2$ absorber.

7. The $CO_2$ capture and utilization system of claim 1, wherein the membrane $CO_2$ absorber is a hollow fiber membrane.

8. The $CO_2$ capture and utilization system of claim 7, wherein the membrane $CO_2$ absorber includes a non-porous polymer comprising a fluoride material and a microporous hollow fiber support comprising polyether ether ketone (PEEK).

9. The $CO_2$ capture and utilization system of claim 1, wherein the membrane $CO_2$ absorber is a flat sheet membrane.

10. The $CO_2$ capture and utilization system of claim 9, wherein the membrane of the membrane $CO_2$ absorber includes a polyethersulfone (PES) and polytetrafluoroethylene (PTFE).

11. The $CO_2$ capture and utilization system of claim 1, wherein the utilization unit includes a solvent regenerator in fluid communication with the membrane $CO_2$ absorber and configured to process the $CO_2$-rich solvent to produce the product stream.

12. The $CO_2$ capture and utilization system of claim 11, wherein the solvent regenerator is located relative to the cultivation subsystem, such that the solvent generator provides distribution of the predetermined $CO_2$:$NH_3$ ratio to the cultivation subsystem, and wherein an operating temperature and an operating pressure of the solvent regenerator can be adjusted to affect the predetermined $CO_2$:$NH_3$ ratio.

13. The $CO_2$ capture and utilization system of claim 12, wherein the cultivation subsystem includes at least one of a photobioreactor and an open raceway pond.

14. The $CO_2$ capture and utilization system of claim 1, wherein the predetermined $CO_2$:$NH_3$ ratio is about 10:1.

15. The $CO_2$ capture and utilization system of claim 1, wherein a lean solvent corresponding to a portion of the $CO_2$-rich solvent remaining after $NH_3$ is removed from the $CO_2$-rich solvent to produce the product stream is transferred from the utilization unit to the membrane $CO_2$ absorber.

* * * * *